US010210288B2

(12) United States Patent
Healey et al.

(10) Patent No.: US 10,210,288 B2
(45) Date of Patent: Feb. 19, 2019

(54) SYSTEMS AND METHODS OF VISUALIZING AIRFLOW

(71) Applicant: SCHNEIDER ELECTRIC IT CORPORATION, West Kingston, RI (US)

(72) Inventors: Christopher M. Healey, Tewksbury, MA (US); James William VanGilder, Pepperell, MA (US)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 347 days.

(21) Appl. No.: 14/655,563

(22) PCT Filed: Dec. 27, 2012

(86) PCT No.: PCT/US2012/071727
§ 371 (c)(1),
(2) Date: Jun. 25, 2015

(87) PCT Pub. No.: WO2014/105014
PCT Pub. Date: Jul. 3, 2014

(65) Prior Publication Data
US 2015/0331977 A1    Nov. 19, 2015

(51) Int. Cl.
*G06F 17/10*    (2006.01)
*G06F 17/50*    (2006.01)
*G06F 17/11*    (2006.01)

(52) U.S. Cl.
CPC .......... *G06F 17/5009* (2013.01); *G06F 17/11* (2013.01); *G06F 2217/16* (2013.01)

(58) Field of Classification Search
CPC ............................. G06F 17/5009; G06F 17/11
(Continued)

(56) References Cited

U.S. PATENT DOCUMENTS

| 6,694,759 B1 | 2/2004 | Bash et al. |
| 6,718,277 B2 | 4/2004 | Sharma |

(Continued)

FOREIGN PATENT DOCUMENTS

| AU | 2012201080 A1 | 3/2012 |
| CN | 101089779 A | 12/2007 |

(Continued)

OTHER PUBLICATIONS

Extended European Search Report from corresponding European Application No. 12890945.4 dated Jun. 28, 2016.

(Continued)

*Primary Examiner* — Andre Pierre Louis
(74) *Attorney, Agent, or Firm* — Lando & Anastasi, LLP

(57) ABSTRACT

According to one aspect, embodiments described herein provide a system and a method for modeling airflow. In one example, the system comprises a memory and a controller coupled to the memory, the controller configured to receive data related to equipment including at least two of a group comprising a cooling consumer and a cooling provider, compute at least one quantity of airflow between an inlet and an outlet associated with the equipment, generate a representation of at least one airflow path between the outlet and the inlet having a cross-sectional area proportional to the at least one quantity of airflow, and display the representation of the at least one airflow path in a cooling model.

18 Claims, 13 Drawing Sheets

(58) Field of Classification Search
USPC .......................................................... 703/2
See application file for complete search history.

(56) References Cited

U.S. PATENT DOCUMENTS

| | | | |
|---|---|---|---|
| 6,889,908 | B2 | 5/2005 | Crippen et al. |
| 7,051,946 | B2 | 5/2006 | Bash et al. |
| 7,315,448 | B1 | 1/2008 | Bash et al. |
| 7,334,630 | B2 | 2/2008 | Goodson et al. |
| 7,472,043 | B1 | 12/2008 | Low et al. |
| 7,558,649 | B1 | 7/2009 | Sharma et al. |
| 7,568,360 | B1 | 8/2009 | Bash et al. |
| 7,596,476 | B2 | 9/2009 | Rasmussen et al. |
| 7,620,480 | B2 | 11/2009 | Patel et al. |
| 7,676,280 | B1 | 3/2010 | Bash et al. |
| 7,726,144 | B2 | 6/2010 | Larson et al. |
| 7,832,925 | B2 | 11/2010 | Archibald et al. |
| 7,881,910 | B2 | 2/2011 | Rasmussen et al. |
| 7,885,795 | B2 | 2/2011 | Rasmussen et al. |
| 7,908,126 | B2 | 3/2011 | Bahel et al. |
| 7,979,250 | B2 | 7/2011 | Archibald et al. |
| 7,991,592 | B2 | 8/2011 | VanGilder et al. |
| 8,155,922 | B2 | 4/2012 | Loucks |
| 8,201,028 | B2 | 6/2012 | Sawczak et al. |
| 8,209,056 | B2 | 6/2012 | Rasmussen et al. |
| 8,219,362 | B2 | 7/2012 | Shrivastava et al. |
| 8,229,713 | B2 | 7/2012 | Hamann et al. |
| 8,244,502 | B2 | 8/2012 | Hamann et al. |
| 8,249,825 | B2 | 8/2012 | VanGilder et al. |
| 8,315,841 | B2 | 11/2012 | Rasmussen et al. |
| 8,425,287 | B2 | 4/2013 | Wexler |
| 8,473,265 | B2 | 6/2013 | Hlasny et al. |
| 8,509,959 | B2 | 8/2013 | Zhang et al. |
| 8,639,482 | B2 | 1/2014 | Rasmussen et al. |
| 8,825,451 | B2 | 9/2014 | VanGilder et al. |
| 2004/0065104 | A1 | 4/2004 | Bash et al. |
| 2004/0075984 | A1 | 4/2004 | Bash et al. |
| 2004/0083012 | A1 | 4/2004 | Miller |
| 2004/0089009 | A1 | 5/2004 | Bash et al. |
| 2004/0240514 | A1 | 12/2004 | Bash et al. |
| 2004/0262409 | A1 | 12/2004 | Crippen et al. |
| 2005/0267639 | A1 | 12/2005 | Sharma et al. |
| 2006/0080001 | A1 | 4/2006 | Bash et al. |
| 2006/0121421 | A1 | 6/2006 | Spitaels et al. |
| 2006/0168975 | A1 | 8/2006 | Malone et al. |
| 2006/0214014 | A1 | 9/2006 | Bash et al. |
| 2007/0038414 | A1 | 2/2007 | Rasmussen et al. |
| 2007/0078635 | A1 | 4/2007 | Rasmussen et al. |
| 2007/0291817 | A1 | 12/2007 | Bradicich et al. |
| 2008/0041076 | A1 | 2/2008 | Tutunoglu et al. |
| 2008/0055850 | A1 | 3/2008 | Carlson et al. |
| 2008/0104985 | A1 | 5/2008 | Carlsen |
| 2008/0105412 | A1 | 5/2008 | Carlsen et al. |
| 2008/0174954 | A1 | 7/2008 | VanGilder et al. |
| 2009/0138313 | A1 | 5/2009 | Morgan et al. |
| 2009/0138888 | A1 | 5/2009 | Shah et al. |
| 2009/0150123 | A1 | 6/2009 | Archibald et al. |
| 2009/0168345 | A1 | 7/2009 | Martini |
| 2009/0205416 | A1 | 8/2009 | Campbell et al. |
| 2009/0223234 | A1 | 9/2009 | Campbell et al. |
| 2009/0326879 | A1 | 12/2009 | Hamann et al. |
| 2009/0326884 | A1 | 12/2009 | Amemiya et al. |
| 2010/0106464 | A1 | 4/2010 | Hlasny et al. |
| 2010/0131109 | A1 | 5/2010 | Rasmussen et al. |
| 2010/0211810 | A1 | 8/2010 | Zacho |
| 2010/0256959 | A1 | 10/2010 | VanGilder et al. |
| 2010/0286956 | A1* | 11/2010 | VanGilder .............. G06Q 10/04 702/182 |
| 2010/0287018 | A1 | 11/2010 | Shrivastava et al. |
| 2010/0305718 | A1 | 12/2010 | Clark et al. |
| 2011/0040529 | A1 | 2/2011 | Hamann et al. |
| 2011/0246147 | A1 | 10/2011 | Rasmussen et al. |
| 2011/0301911 | A1 | 12/2011 | VanGilder et al. |
| 2011/0307820 | A1 | 12/2011 | Rasmussen et al. |
| 2011/0316706 | A1 | 12/2011 | Cash et al. |
| 2012/0041569 | A1 | 2/2012 | Zhang et al. |
| 2012/0071992 | A1 | 3/2012 | VanGilder et al. |
| 2012/0158387 | A1* | 6/2012 | VanGilder .............. G06F 17/5009 703/9 |
| 2012/0170205 | A1 | 7/2012 | Healey et al. |
| 2012/0245905 | A1* | 9/2012 | Dalgas ................ G06F 17/5004 703/2 |
| 2012/0253769 | A1 | 10/2012 | Poondru et al. |
| 2013/0006426 | A1 | 1/2013 | Healey et al. |
| 2013/0030585 | A1 | 1/2013 | Rasmussen et al. |
| 2013/0139530 | A1 | 6/2013 | Tutunoglu et al. |
| 2013/0297267 | A1 | 11/2013 | Liang et al. |
| 2014/0098494 | A1* | 4/2014 | Downing .............. H01L 23/467 361/695 |
| 2014/0122033 | A1* | 5/2014 | VanGilder ........... G06F 17/5009 703/2 |

FOREIGN PATENT DOCUMENTS

| | | |
|---|---|---|
| CN | 101589656 A | 11/2009 |
| CN | 201514313 U | 6/2010 |
| CN | 102449606 A | 5/2012 |
| EP | 2147585 A2 | 1/2010 |
| EP | 2482213 A1 | 8/2012 |
| WO | 2003081406 A1 | 10/2003 |
| WO | 20050122664 A1 | 12/2005 |
| WO | 2006119248 A2 | 11/2006 |
| WO | 20060124240 A2 | 11/2006 |
| WO | 2007095144 A2 | 8/2007 |
| WO | 2008144375 A2 | 11/2008 |
| WO | 2009/014893 A1 | 1/2009 |
| WO | 2010068434 A1 | 6/2010 |
| WO | 2011/019615 A1 | 2/2011 |
| WO | 2012037427 A1 | 3/2012 |
| WO | 2012082985 A2 | 6/2012 |
| WO | 2012135038 A1 | 10/2012 |
| WO | 2013/095494 A1 | 6/2013 |

OTHER PUBLICATIONS

Vanessa Lopez et al: "Heat transfer modeling in data centers", International Journal of Heat and Mass Transfer, vo 1 . 54, No. 25, Sep. 15, 2011 (Sep. 15, 2011), pp. 5306-5318, XP028298268, ISSN: 0017-9310, DOI: 10.1016/j.ijheatmasstransfer.2011.08.012 [retrieved on Aug. 10, 2011].
Gilbert, R. Validation of Computational Fluid Dynamics Based Data Center Cyber-Physical Models. Arizona State University. May 2012. [Retrieved Feb. 21, 2013].[Retrieved from internet: <URL:http://impact.asu.edu/thesis/Robin_thesis.pdf>]. entire document.
Inlet and Outlet Areas. University of Oregon. unknown. [retrived Feb. 21, 2013].[Retrieved from internet:<URL: pages.uoregon.edu/esbl/es _site/student_option/explanations folder/inlet_outlet_areas.htm> ]. entire document.
Notification of Transmittal of the International Search Report and the Written Opinion of the International Searching Authority from corresponding PCT/US2012/071727 dated Mar. 11, 2013.
"Case Study, Application of TileFlow to Improve Cooling in a Data Center," Innovative Research, Inc., 2004.
"Essential Cooling System Requirements for Next Generation Data Centers," White Paper #5, Revision 3, 2003 American Power Conversion, Rev 2002-3, pp. 1-10.
"How and Why Mission-Critical Cooling Systems Differ From Common Air Conditions," White Paper #56, Revision 2, 2003 American Power Conversion, Rev 2003-2, pp. 1-13.
"Management Strategy for Network Critical Physical Infrastructure", White Paper #100, pp. 110, American Power Conversion, Dec. 15, 2003, published on World Wide Web.
"Optimizing facility operation in high density data center environments," 2007, Hewlett-Packard Development , Company, pp. 1-25.
Abi-Zadeh, Davar et al., "A Transient Analysis of Environmental Conditions for a Mission Critical Facility after a Failure of Power", Arup Mission Criticial Facilities, Feb. 2001, pp. 1-12.
Ahmad, Jasim U. et al., "Navier-Stokes simulation of air-conditioning facility of a large modern computer room,", Jun. 2005,

(56) References Cited

OTHER PUBLICATIONS

Proceedings of the 2005 ASME Fluids Engineering Division Summer Meeting and Exhibition, pp. 1-6.
APC User's Guide Brochure, "InfraStruXure Manager," Mar. 2004, 181 pgs.
Ashrae, "Thermal Guidelines for Data Processing Environments" 2004, Atlanta: American Society of Heating, Refrigerating, and Air-Conditioning Engineers, Inc., 2004, Atlanta.
Bash, C. E. et al.: "Balance of Power Dynamic Thermal Management for Internet Data Centers", IEEE Internet Computing, Jan. 1, 2005, pp. 42-49, vol. 9, No. 1, IEEE Service Center, New York, NY.
Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.
Beaty et al., "High Density Cooling of Data Centers and Telecom Facilities—Part 2," 2005, ASHRAE Transactions, vol. 111, pp. 932-944.
Beitelmal et al., "Thermo-Fluids Provisioning of a High Performance High Density Data Center", Apr. 22, 2006, Springer Science and Business Media, Inc, Distributed and Parallel Databases, 21, pp. 227-238 DOI:1 0.1 007/s1 0619-005-0413-0.
Bemis et al, Data Center Airflow Modeling: Helps Facilities Planners Make Informed Decisions. Applied Math Modeling Inc. 2009 [retrieved on Apr. 19, 2012). Retrieved from the Internet: <URL: http:I/www.coolsimsoftware.com/wwwrooULinkCiick.aspx?fileticket= r1 SqFUDtRTk%3D&tabid=189> entire document.
Chandrakant D. Patel, et al., "Thermal Considerations in Cooling Large Scale High Copute Density Data Centers" IEEE 2002, pp. 767-776.
Chen, Q.and Srebric, J., "Simplified Diffuser Boundary Conditions for Numerical Room Airflow Models," Final Report for ASHRAE RP-1009, Department of Architecture, Massachusetts Institute of Technology, Cambridge, MA, 2000, 181 pages.
Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.
Ehsan Pakabaznia et al., "Miminizing data center cooling and server power costs", Proceedings of the 14th ACM/IEEE International Symposium on Low Power Electronics and Design, ISLPED '09, Jan. 1, 2009 (Jan. 1, 2009), p. 145, XP55015368, New York, New York, USA, DOI: 10.1145/1594233.1594268, ISBN: 978-1-60-558684-7.
Healey, C., et al., "Potential-Flow Modeling for Data Center Applications," Proceedings of the ASME 2011 Pacific Rim Technical Conference & Exposition on Packaging and Integration of Electronic and Photonic Systems, IPACK2011-52136, Jul. 6-8, 2011.
Herrlin, M.K., "Rack Cooling Effectiveness in Data Centers and Telecom Central Offices: The Rack Cooling Index (RCI)," ASHRAE Transaction, 2005, pp. 725-731, vol. 111(2).
Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007 (Jan. 20, 2007), pp. 193-225, XP019499845, ISSN: 1573-7578, DOI:10.1007/S10619-006-7007-3.
Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008 (Aug. 1, 2008), pp. 1129-1142, ISSN: 0018-9340, DOI: 10.1109/TC.2008.52.
K. Dunlap, "Cooling Audit for Identifying Potential Cooling Problems in Data Centers", White Paper #40, pp. 1-18, American Power Conversion, May 20, 2004, published on World Wide Web.
Karki et al., "Techniques for controlling airflow distribution in raised-floor data centers," ASME 2003.
Marwah, M.; Sharma, R.; Shih, R.; Patel, C.; Bhatia, V.; Mekanapurath, M.; Velumani, R.; Velayudhan, S., 2009, Data analysis, visualization and knowledge discovery in sustainable data centers, in Proceedings of the 2nd Bangalore Annual Compute Conference (COMPUTE '09).
N. Rasmussen, "Calculating Total Cooling Requirements for Data Centers", White Paper #25, pp. 1-8, American Power Conversion, May 20, 2004, published on World Wide Web.
N. Rasmussen, "Cooling Strategies for Ultra-High Density Racks and Blade Servers", White Paper #46, pp. 1-22, American Power Conversion, Mar. 29, 2005, published on World Wide Web.
N. Rasmussen, "Strategies for Deploying Blade Servers in Existing Data Centers", White Paper #125, pp. 1-14, American Power Conversion, Mar. 29, 2005, published on World Wide Web.
Neil Rasmussen, "Air Distribution Architecture Options for Mission Critical Facilities," White Paper #55, Revision 1, 2003 American Power Conversion, Rev 2003-0, pp. 1-13.
Neil Rasmussen, "Avoidable Mistakes that Compromise Cooling Performance in Data Centers and Network Rooms," White Paper #49, 2003 American Power Conversion, Rev 2003-0, pp. 1-15.
Neil Rasmussen, "Cooling Options for Rack Equipment with Side-to-Side Airflow," White Paper #50, 2004 American Power Conversion, Rev 2004-0, pp. 1-14.
Neil Rasmussen, "Guidelines for Specification of Data Center Power Density," White Paper #120, 2005 American Power Conversion, Rev 2005-0, pp. 1-21.
Pakbaznia, E.; Ghasemazar, M.; Pedram, M.:, "Temperature-aware dynamic resource provisioning in a power-optimized datacenter," Design, Automation & Test in Europe Conference & Exhibition (DATE), 2010, vol., No., pp. 124-129, Mar. 8-12, 2010.
Refai-Ahmed G. et al., "Analysis of flow distribution in power supply using flow network modeling (FNM)", Thermal and Thermomechanical Phenomena in Electronic Systems, 2000, IT HERM 2000, The Seventh Intersociety Conference on May 23-26, 2000, Piscataway, NJ, USA, IEEE, Piscataway, NJ, USA, vol. 1, May 23, 2000 (May 23, 2000), pp. 90-98, ISBN: 978-0-7803-5912-3.
Schmidt et al., "Best practices for data center thermal and energy management-review of literature," ASHRAE Transactions, vol. 112, pp. 206-218 [2007].
Sharma, R.K, Bash, C.E., and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.
Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.
Shrivastava S.K. et al., "A flow-network model for predicting rack cooling in containment systems", Proceedings of the ASME Interpack Conference—2009: Presented at 2009 ASME Interpack Conference, Jul. 19-23, 2009, San Francisco, California, USA, vol. 2, Jul. 19, 2009 (Jul. 19, 2009), pp. 785-791.
Sinha et al., "Numerical simulation of two-dimensional room air flow with and without buoyancy", Energy and Buildings, vol. 32, Issue 1, Jun. 2000, pp. 121-129.
Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lake Buena Vista, Florida, USA, vol. 13: New Del, vol. 13, Jan. 1, 2009 (Jan. 1, 2009), pp. 41-50, DOI: 10.1115/IMECE2009-10806, ISBN: 978-0-7918-4386-4.
Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010 (Jun. 2, 2010), pp. 1-8, XP031702357.
VanGilder et al., "Airflow Uniformity through Perforated Tiles in a Raised-Floor Data Center", White Paper 121, Jul. 17-22, 2005, 10 pages.
VanGilder et al., "Partially decoupled aisle method for estimating rack-cooling performance in near-real time," 2007, Proceedings of the IPACK2007 ASME InterPACK07, pp. 781-789.

(56) References Cited

OTHER PUBLICATIONS

VanGilder, Real-Time Data Center Cooling Analysis, APC by Schneider Electric, Billerica, MA USA, Electronics Cooling, Sep. 2011, pp. 14-16.

VanGilder, James W. et al., "Caputure index: an airflow-based rack cooling performance metric," 2007, ASHRAE Transactions, vol. 113, pp. 126-136.

VanGilder, James W. et al., "Real-Time prediction of rack-cooling performance," 2006, ASHRAE Transactions, vol. 112, pp. 151-162.

Verhoff, A., The Two-Dimensional, Turbulent Wall Jet with and without an External Free Stream, Office of Naval Research Department of the Navy Contact Nonr 1858(14) in Co-Operation with Bureau of Naval Weapons, Report No. 626, May 1963.

Karki, K.C. et al., "Use of Computational Fluid Dynamics for Calculating Flow Rates Through Perforated Tiles in Raised-Floor Data Centers," International Journal of Heating, Ventilation, Air-Conditioning, and Refrigeration Research, vol. 9, No. 2, Apr. 2003, pp. 153-166.

Rambo et al. "Modeling of data center airflow and heat transfer: State of the art and future trends", Distrib Parallel Databases (2007) 21:193-225.

* cited by examiner

SYSTEMS AND METHODS OF VISUALIZING AIRFLOW

BACKGROUND

This application is a U.S. National Stage Application under 35 U.S.C. § 371 from International Application No. PCT/US2012/071727, filed Dec. 27, 2012, which is hereby incorporated by reference in its entirety for all purposes.

1. Field of the Invention

At least one embodiment in accordance disclosed herein relates generally to systems and methods for data center management and design, and more specifically, to systems and methods for modeling airflow in a data center.

2. Discussion of Related Art

In response to the increasing demands of information-based economies, information technology networks continue to proliferate across the globe. One manifestation of this growth is the centralized network data center. A centralized network data center typically consists of various information technology equipment, collocated in a structure that provides network connectivity, electrical power and cooling capacity. Often the equipment is housed in specialized enclosures termed "racks" which integrate these connectivity, power and cooling elements. In some data center configurations, these rows are organized into hot and cold aisles to decrease the cost associated with cooling the information technology equipment. A raised floor having an air plenum beneath the floor is typically used for providing cooling air to the racks. Cool air is distributed from the air plenum to the racks through perforated tiles having open areas.

Various processes and software applications, such as the data center management systems available from American Power Conversion (APC) Corporation by Schneider Electric of West Kingston, R.I., have been developed to aid data center personnel in designing and maintaining efficient and effective data center configurations. These tools often guide data center personnel through activities such as designing the data center structure, positioning equipment within the data center prior to installation and repositioning equipment after construction and installation are complete. Thus, conventional tool sets provide data center personnel with a standardized and predictable design methodology.

SUMMARY

According to one aspect, a system for modeling airflow is disclosed. In one example, the system comprises a memory and a controller coupled to the memory, the controller configured to receive data related to equipment including at least two of a group comprising a cooling consumer and a cooling provider, compute at least one quantity of airflow between an inlet and an outlet associated with the equipment, generate a representation of at least one airflow path between the outlet and the inlet having a cross-sectional area proportional to the at least one quantity of airflow, and display the representation of the at least one airflow path in a cooling model.

In at least one embodiment, the at least one quantity of airflow comprises at least one fractional quantity of airflow including one of a fraction of airflow that originates from the cooling consumer that is captured by the cooling provider, or a fraction of airflow captured by the cooling consumer that originates from the cooling provider. In the system, the controller may be further configured to generate the representation of the at least one airflow path such that the cross-sectional area of airflow into and out of the equipment is proportional to an inlet or an outlet area of the equipment.

In the system, the controller may be configured to generate the representation of the at least one airflow path such that a total amount of airflow into and out of the equipment corresponds to a total inlet or outlet area of the equipment. In one example, the controller provides an indication for a user to arrange equipment in a data center based on the representation of the at least one airflow path. In the method, the at least one quantity of airflow may include at least one quantity of recirculated airflow.

In at least one example, the controller is configured to generate three-dimensional airflow paths having a rectangular shape. In another example, the controller is configured to generate three-dimensional airflow paths having a tubular shape. In other examples, the controller is configured to generate the representation of the at least one airflow path for the sources having the airflow quantities exceeding a predetermined threshold.

In the system, the controller may be configured to compute at least one cooling power quantity as a function of heat generated by the cooling consumer and the at least one quantity of airflow, generate at least one cooling power path from the cooling provider to the cooling consumer having a cross-sectional area based on the at least one cooling power quantity, and display the representation of the at least one cooling power path in the cooling model.

According to another aspect, a method for modeling airflow is disclosed. In one example, the method comprises receiving data related to equipment including at least two of a group comprising a cooling consumer and a cooling provider computing, by a computer system, at least one quantity of airflow between an inlet and an outlet associated with the equipment, generating, by the computer system, a representation of at least one airflow path between the inlet and the outlet having a cross-sectional area proportional to the at least one quantity of airflow, and displaying, by the computer system, the representation of the at least one airflow path in a cooling model.

In the method, computing the at least one quantity of airflow may further comprise computing at least one fractional quantity of airflow, representing one of a fraction of airflow originating from the cooling consumer that is captured by the cooling provider, or a fraction of airflow entering the cooling consumer that originates from the cooling provider. In at least one example, the method further comprises comprising arranging equipment in a data center based on the representation of the at least one airflow path.

In the method, generating the representation may further comprise generating the representation of the at least one airflow path such that the cross-sectional area of airflow into and out of the equipment is proportional to an inlet or an outlet area of the equipment. In one example, generating the representation may further comprise generating the representation of the at least one airflow path such that a total amount of airflow into and out of the equipment corresponds to a total inlet or outlet area of the equipment.

In the method, the at least one quantity of airflow may include at least one quantity of recirculated airflow. In addition, generating the representation of the at least one airflow path may further comprise generating three-dimensional airflow paths having a rectangular shape. Further, generating the representation of the at least one airflow path may further comprise generating three-dimensional airflow paths having a tubular shape.

In one example, the method may further comprise computing at least one cooling power quantity as a function of heat generated by the cooling consumer and the at least one fractional quantity of airflow, generating at least one cooling power path from the cooling provider to the cooling consumer having a cross-sectional area based on the at least one cooling power quantity, and displaying the representation of the at least one cooling power path in the cooling model.

According to another aspect, a non-transitory computer readable medium having stored thereon sequences of instruction for visualizing airflow including instructions that will cause at least one processor to receive data related to equipment including at least two of a group comprising a cooling consumer and a cooling provider, compute at least one quantity of airflow between an inlet and an outlet associated with the equipment, generate a representation of at least one airflow path between the inlet and the outlet having a cross-sectional area proportional to the at least one quantity of airflow, and display the representation of the at least one airflow path in a cooling model.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

At least some embodiments in accordance with the present invention relate to systems and processes through which a user may design and analyze data center configurations. These systems and processes may facilitate this design and analysis activity by allowing the user to create models of data center configurations from which performance metrics may be determined. Both the systems and the user may employ these performance metrics to determine alternative data center configurations that meet various design objectives. According to one embodiment, systems and methods described herein employ performance metrics to generate three-dimensional airflow paths in a data center. The cross sectional area of the airflow paths is proportional to the airflow between an inlet and an exhaust of combinations of cooling consumers and producers. The airflow can include airflow between rack to rack, cooler to cooler, and rack to cooler combinations. The airflow paths method provides visualization of airflow in a manner that is more organized and straightforward than the traditional methods.

Example System Architecture

Figure 1:
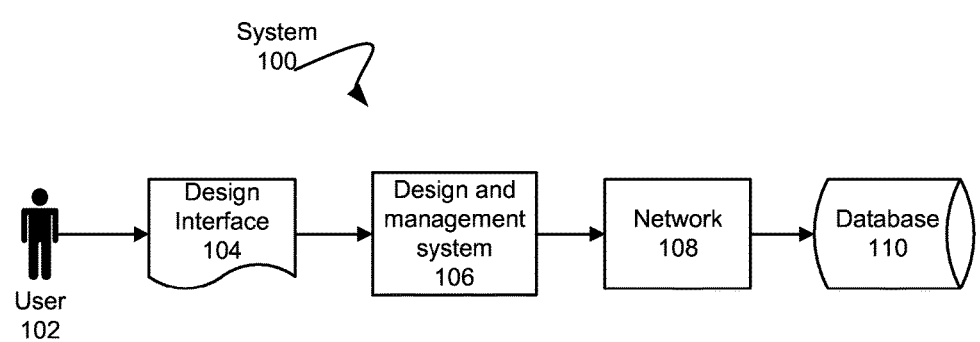
FIG. 1 a schematic of one example of a distributed system including a data center management system.

FIG. 1 presents a context diagram including physical and logical elements of distributed system 100. As shown, distributed system 100 is specially configured in accordance with the presently disclosed embodiments. The system structure and content recited with regard to FIG. 1 is for exemplary purposes only and is not intended to limit the embodiments to the specific structure shown in FIG. 1. As will be apparent to one of ordinary skill in the art, many variant system structures can be architected without deviating from the scope of the presently disclosed embodiments. The particular arrangement presented in FIG. 1 was chosen to promote clarity. Information may flow between the elements, components and subsystems depicted in FIG. 1 using any technique. Such techniques include, for example, passing the information over the network via TCP/IP, passing the information between modules in memory and passing the information by writing to a file, database, or some other non-volatile storage device. Other techniques and protocols may be used without departing from the scope of the presently disclosed embodiments.

Referring to FIG. 1, system 100 includes user 102, interface 104, data center design and management system 106, communications network 108 and data center database 110. System 100 may allow user 102, such as a data center architect or other data center personnel, to interact with interface 104 to create or modify a model of one or more data center configurations.

As described in Patent Cooperation Treaty Application No., PCT/US08/051908, titled "System and Method for Evaluating Equipment Rack Cooling," filed Jan. 24, 2008 (referred to herein as "the PCT/US08/051908 Application"), and in U.S. Patent Application No. PCT/US06/16739, titled "Methods and Systems for Managing Facility Power and Cooling" filed Jan. 27, 2006, (referred to herein as "the PCT/US06/16739 application"), each of which is assigned to the assignee of the present application, and each of which is hereby incorporated herein by reference in its entirety, typical equipment racks in modern data centers draw cooling air into the front of the rack and exhaust air out of the rear of the rack. The equipment racks and in-row coolers are typically arranged in rows in an alternating front/back arrangement creating alternating hot and cool aisles in a data center with the front of each row of racks facing the cool aisle and the rear of each row of racks facing the hot aisle. In descriptions herein, equipment in racks, or the racks themselves, may be referred to as cooling consumers, and in-row cooling units and/or computer room air conditioners (CRACs) may be referred to as cooling providers.

Adjacent rows of equipment racks separated by a cool aisle may be referred to as a cool aisle cluster, and adjacent rows of equipment racks separated by a hot aisle may be referred to as a hot aisle cluster. Further, single rows of equipment may also be considered to form both a cold and a hot aisle cluster by themselves. A row of equipment racks may be part of multiple hot aisle clusters and multiple cool aisle clusters. In descriptions and claims herein, equipment in racks, or the racks themselves, may be referred to as cooling consumers, and in-row cooling units and/or computer room air conditioners (CRACs) may be referred to as cooling providers. In the referenced applications, tools are provided for analyzing the cooling performance of a cluster of racks in a data center. In these tools, multiple analyses may be performed on different layouts to attempt to optimize the cooling performance of the data center.

The equipment racks in the data centers may include a plurality of different types of devices. In one example, a server may be included in the equipment rack. For example, a server may be a physical server, a dedicated server, or a virtual server. A physical server generally includes hardware where an operating system is run. A dedicated server generally includes a service application running on a physical server. For example, a dedicated server may include a web service or file transfer protocol (FTP) service on an operating system, where the service application can be coupled to the physical server. A virtual server can include a service that is independent of physical server hardware. In one embodiment, there can be one dedicated server operating system per physical server and multiple virtual servers per physical server. A virtual server can run concurrent with (e.g., on top of) a dedicated server.

According to one embodiment, the data center may further include perforated tiles of an under-floor plenum as described in the Patent Cooperation Treaty Application No. PCT/US11/051866, entitled SYSTEM AND METHOD FOR PREDICTING PERFORATED TILE AIRFLOW IN A DATA CENTER, filed Sep. 16, 2011, which is assigned to the assignee of the present application, and which is incorporated herein by reference in its entirety (referred to herein as "the PCT/US11/051866 application"). In a typical data center that uses CRACs to provide cooling, airflow output from the CRACs is typically distributed to equipment racks using an under-floor plenum. The CRACs pump cool air into the plenum, and the air exits the plenum through perforated floor tiles which are typically located in the front of equipment racks. For facilities employing a hot aisle/cool aisle design, the perforated tiles are typically contained in the cool aisles.

In the above referenced applications, tools are provided for analyzing the cooling performance of a cluster of equipment in a data center. In these tools, multiple analyses may be performed on different layouts to determine airflows and temperatures in a data center and to attempt to optimize the cooling performance of the data center based on those airflows and temperatures. In at least one example, the data center design and management system 106 may determine the dimensionless Capture Index (CI) metric, which is a cooling performance metric used in at least one embodiment and is based on the airflow patterns associated with the supply of cool air to, or the removal of hot air from a rack. Two variants of capture index may be used in at least one embodiment, one for cold aisle analyses and another for hot aisle analyses.

Other metrics can be calculated by the data center design and management system 106 and may include a cooling power metric, as further described below and a Rack Cooling Index (RCI), which is a measure of the degree to which multiple racks in a data center are kept within some recommended inlet-temperature range. Other metrics calculated by the data center design and management system 106 may include a Supply Heat Index (SHI), and a Return Heat Index (RHI). The return heat index (RHI) and supply heat index (SHI) measure the degree of separation of cool supply and warm return streams on an enthalpy basis and are, therefore, based on temperatures. According to one embodiment, interface 104 may include aspects of a data center floor editor and the rack editor as disclosed in Patent Cooperation Treaty Application No. PCT/US08/63675, entitled METHODS AND SYSTEMS FOR MANAGING FACILITY POWER AND COOLING, filed on May 15, 2008, which is incorporated herein by reference in its entirety (referred to herein as "the PCT/US08/63675 application"). In other embodiments, interface 104 may be implemented with specialized facilities that enable user 102 to design, in a drag and drop fashion, a model that includes a representation of the physical layout of a data center or any subset thereof. This layout may include representations of data center structural components as well as data center equipment. The features of interface 104 are discussed further below. In at least one embodiment, information regarding a data center is received by the system 100 through the interface, and assessments and recommendations for the data center are provided to the user. Further, in at least one embodiment, optimization processes may be performed to optimize cooling performance and energy usage of the data center. For example, the design interface 104 may display aspect of the determined cooling performance, such as the cooling metrics discussed above and the airflow paths discussed below.

As shown in FIG. 1, the data center design and management system 106 presents design interface 104 to the user 102. According to one embodiment, data center design and management system 106 may include the data center design and management system as disclosed in PCT/US08/63675. In this embodiment, the design interface 104 may incorporate functionality of the input module, the display module and the builder module included in PCT/US08/63675 and may use the database module to store and retrieve data.

As illustrated, the data center design and management system 106 may exchange information with the data center database 110 via the network 108. This information may include any information needed to support the features and functions of data center design and management system 106. For example, in one embodiment, data center database 110 may include at least some portion of the data stored in the data center equipment database described in PCT/US08/63675. In another embodiment, this information may include any information needed to support interface 104, such as, among other data, the physical layout of one or more data center model configurations, the production and distribution characteristics of the cooling providers included in the model configurations, the consumption characteristics of the cooling consumers in the model configurations, and a listing of equipment racks and cooling providers to be included in a cluster.

In one embodiment, data center database 110 may store information pertaining to types of cooling providers, the amount of cool air provided by each type of cooling provider, and a temperature of cool air provided by the cooling provider. Thus, for example, data center database 110 includes records pertaining to a particular type of CRAC unit that is rated to deliver airflow at the rate of 5,600 cubic feet per minute (cfm) at a temperature of 68 degrees Fahrenheit. In addition, the data center database 110 may store information pertaining to one or more cooling metrics, such as inlet and outlet temperatures of the CRACs and inlet and exhaust temperatures of one or more equipment racks. The temperatures may be periodically measured and input into the system, or in other embodiments, the temperatures may be continuously monitored using devices coupled to the system 100.

In another embodiment, data center database 110 may store information pertaining to the types of computing or IT (Information Technology) devices (such as servers), and may further include information pertaining to server weight, estimated heat capacity for the server, maximum CPU loading capacity, as well as other information.

Data center database 110 may include any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 1, which include the data center design and management system 106, the network 108 and the data center equipment database 110, each may include one or more computer systems. As discussed above with regard to FIG. 1, computer systems may have one or more processors or controllers, memory and interface devices. The particular configuration of system 100 depicted in FIG. 1 is used for illustration purposes only and embodiments of the invention may be practiced in other contexts. The embodiments described herein are not limited to a specific number of users or systems.

Airflow Path Visualization

Figure 2B:
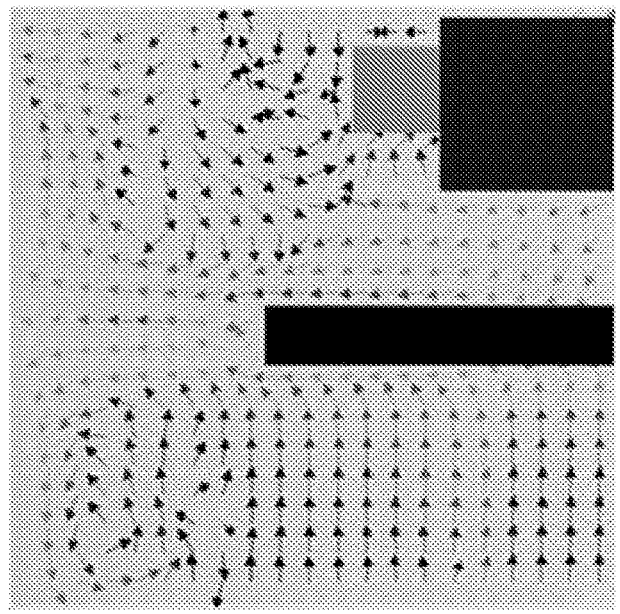
FIG. 2B is a schematic of an example of displaying airflow in a data center.
Figure 2A:
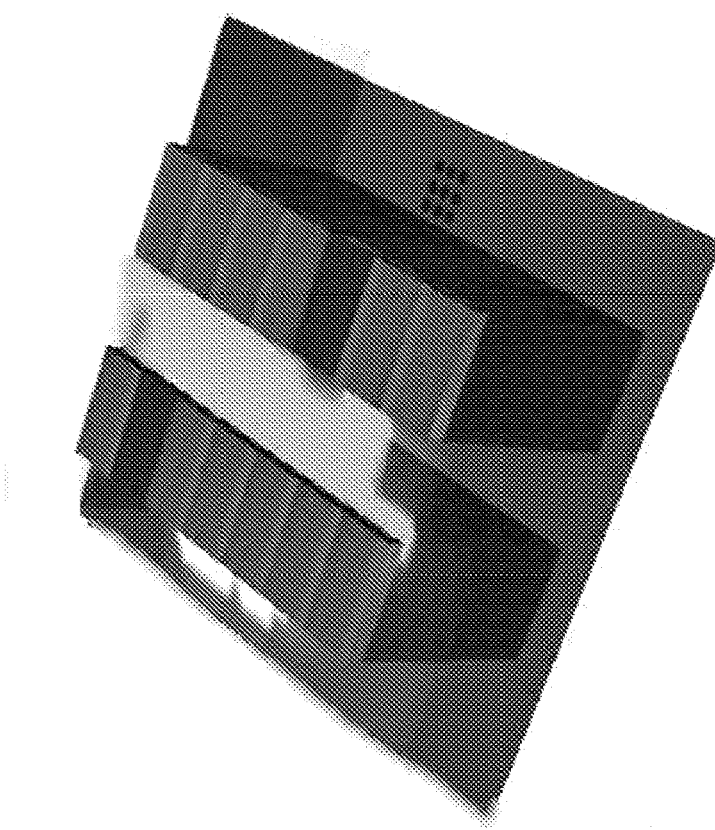
FIG. 2A is a schematic of an example of displaying temperature in a data center.
Figure 2C:
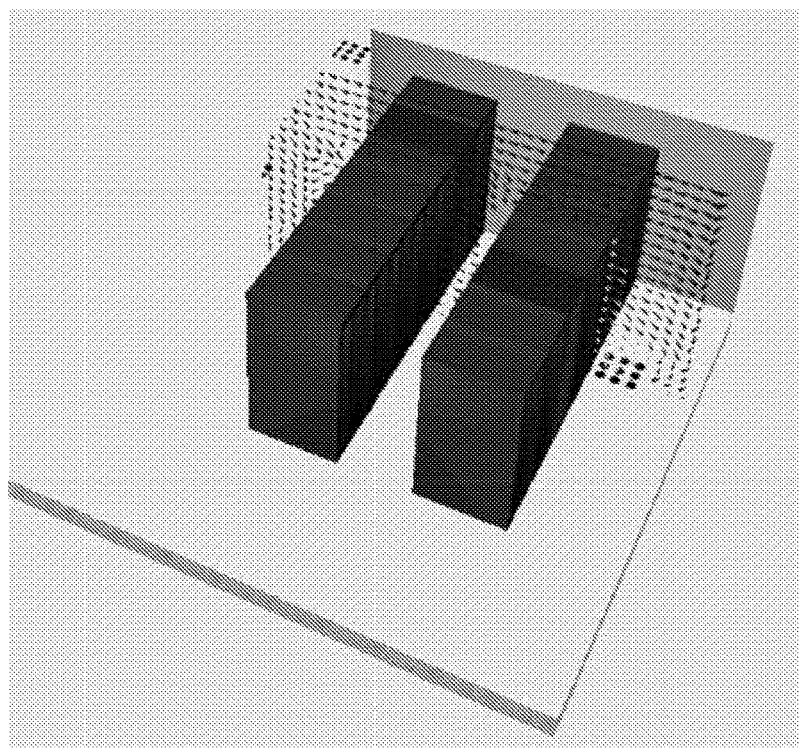
FIG. 2C is a schematic of another example of displaying airflow in a data center.

The traditional way to visualize temperatures in a data center is via a two-dimensional (2D) plane or slice through a three-dimensional (3D) model of a data center. FIG. 2A shows a traditional method of visualizing temperatures as a slice through the model of a data center having two rows of equipment separated by a hot aisle. The temperatures are color-keyed to specific temperature values. Similarly, airflow can be displayed as velocity vector arrows that lie within a 2D plane as shown in FIG. 2B. In addition, airflow can be displayed in a 3D manner at each location in the model intersected by the 2D plane as shown in FIG. 2C. To display temperatures and airflows in a 3D representation of the data center, a model of the data center can be divided into a grid of cells. For each cell in the grid, the temperatures and airflows can be calculated or measured and then displayed in the 3D model. Grid-based approaches provide a high level of granularity for data center performance. However, these approaches can be computationally intensive and provide an excess of information compared to what is needed for a data center designer or operator to effectively design or operate a data center.

In other examples, airflow can also be visualized as a collection of particles which follow the airflow. This visualization method can be thought of as a computational smoke test. Unfortunately, in some examples, computational smoke tests are often difficult to create in a manner that is user friendly and easy to understand because optimum characteristics of animated "smoke" particles vary. For example, length, width, how often they are released, brightness, or other characteristics can vary from application to application and from location to location within a given model as local airflow speeds, length scales, and other parameters vary. As a result, it is very difficult to create a technique for displaying airflow paths that is visually appealing and is easy for the user to create.

Figure 3:
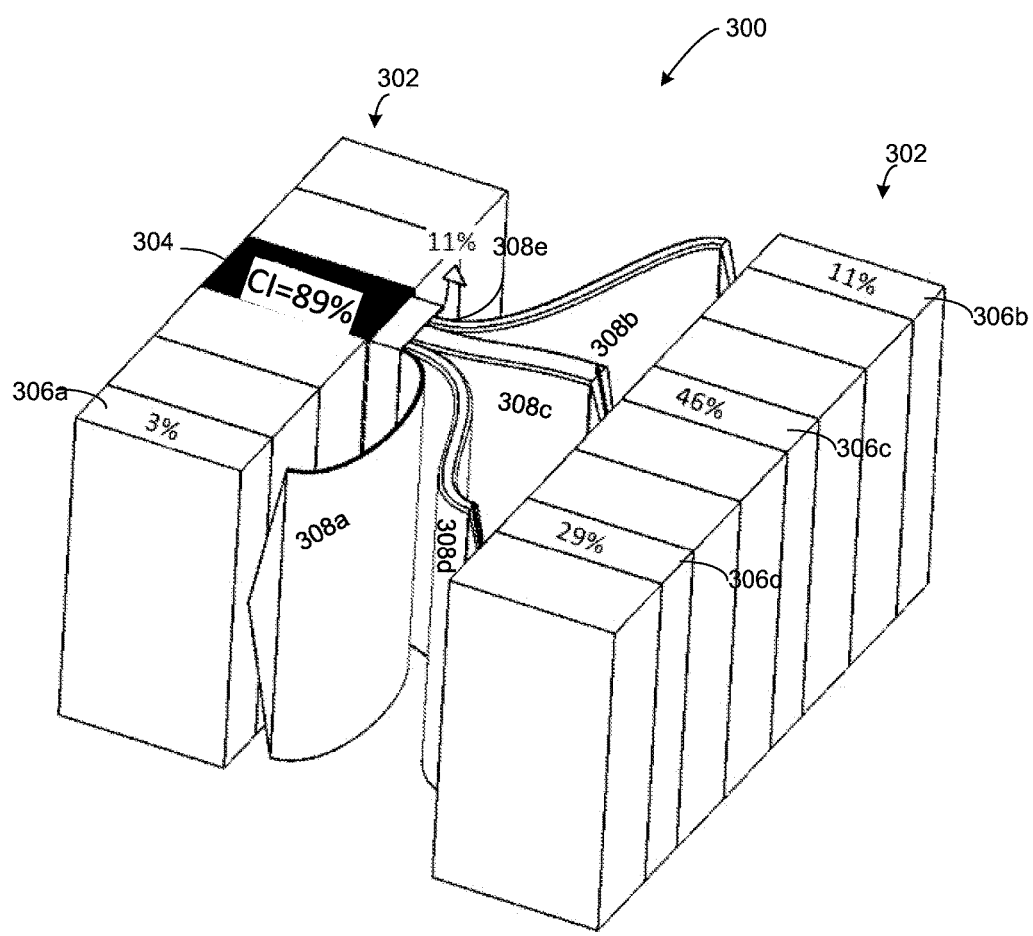
FIG. 3 is a schematic of an example of displaying airflow in accordance with at least one example in a data center cluster in a hot-aisle.
Figure 4:
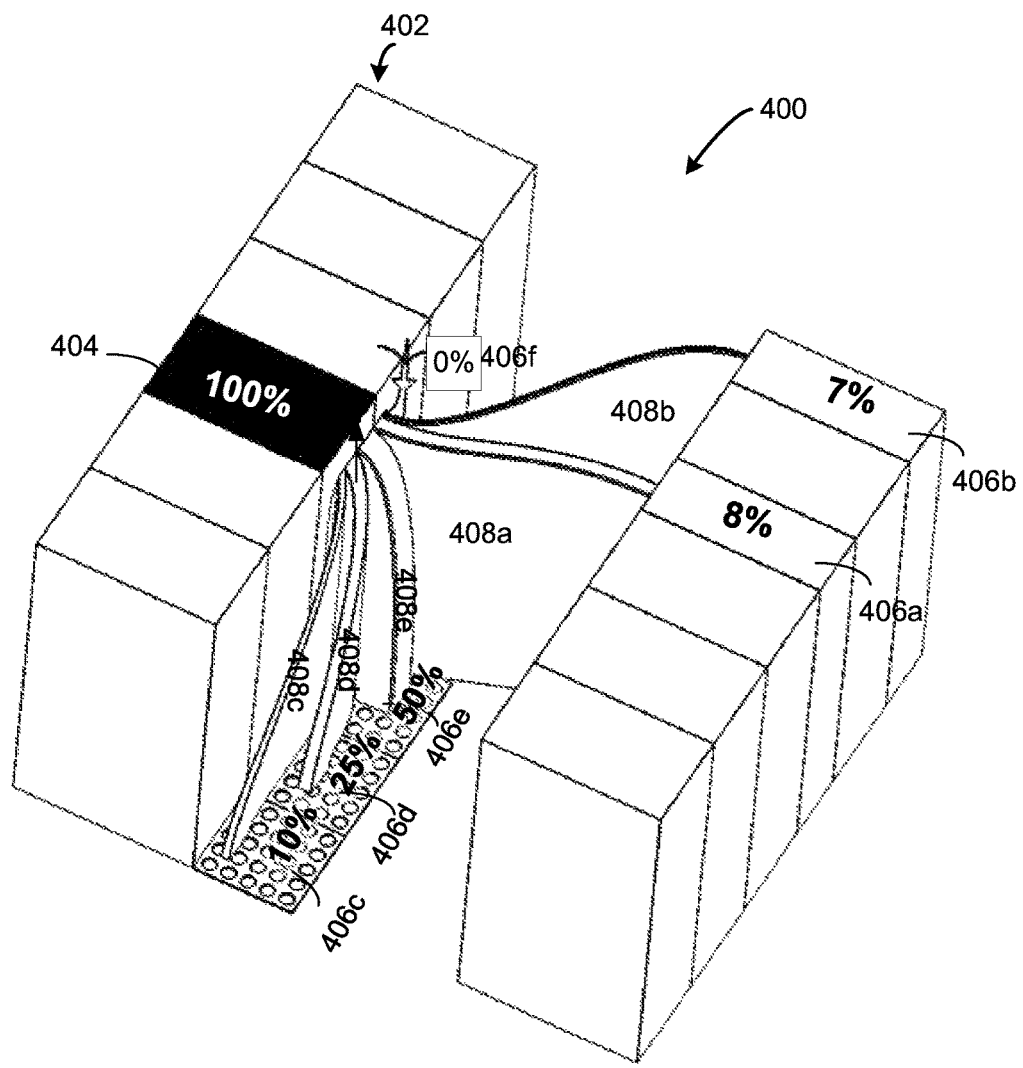
FIG. 4 is a schematic of an example of displaying airflow in accordance with at least one example in a data center cluster in a cold-aisle.

According to some embodiments, a fundamentally different method for visualizing the key airflow paths in a data center is described. The airflow paths method provides visualization of airflow in a manner that is much more orderly and user friendly than the traditional airflow vectors or the computational smoke test methods. According to embodiments described herein, the generated airflow paths are displayed with stylistically created, continuous paths as shown in FIGS. 3 and 4. The visual characteristics of each generated airflow path can be linked to the airflow and temperature characteristics along each airflow path. For example, the cross-sectional area of the airflow path can be proportional to the quantity of airflow between inlets and exhausts of the cooling consumers and providers.

The airflow path visualization method in various examples described below relies on the fact that data center cooling performance depends on the proper management of airflow patterns into and out of each rack and cooler. These "key airflow patterns" carry cool air to the cooling consumers and hot air back to cooling providers. The linking of visual characteristics to characteristics of the airflow patterns provides a way to provide quick and simple feedback and to allow straightforward interpretation for data center designers and operators.

In one example, as further described below, the shape of the airflow path can be linked to the performance metrics, such as the CI metric. The CI metric, according to embodiments described below, relates to how these airflow streams are displayed. In various examples, values of 0% and 100% Hot-Aisle CI imply that none or all of the rack's exhaust airflow is captured directly by local cooling returns respectively. In these examples, values of 0% and 100% Cold-Aisle CI imply that none or all of the rack's inlet airflow originates directly from cooling sources respectively. As further described below, cold-aisle CIs (CACIs) and hot aisle CI (HACIs) can be calculated by computing fractional quantities, which represent fractions of airflow entering and exhausted from a given rack that originate or are captured from a given cooling source. The visualization of the constituent airflow fractional quantities which make up a CI may allow data center operators and designers to ensure that the data center operates reliably and efficiently.

It is appreciated that additional information, such as total airflow, fractional airflow, cooling power, temperature, as well as other information, can be associated with each constituent airflow path. For example, airflow paths can be labeled directly by an airflow rate in "cfm" while the paths for the very same scenario can also be labeled based on the predominant temperature of the constituent airflow paths.

For illustrative purposes FIGS. 3-4 and 6-11 show representation of various arrangements of cooling producers and consumers, including a cluster of two rows of equipment racks separated either by a cold aisle or a hot aisle. However, any arrangements of equipment in a data center can be visualized using the airflow path technique. The airflow paths in the figures are shown in a perspective view, because the rectangular, 3D nature of the airflow paths is particularly clear when viewed from this orientation. However, other representations of airflow paths are possible. In one example, the user via, the interface 104 may rotate the displayed arrangement of equipment to any view. In addition, according to other examples, the airflow paths may be displayed using other geometric shapes discussed further below. For example, the airflow paths may include the use of cross sections of circular or elliptical airflow streams.

The airflow visualization method can be used to illustrate airflow between any source of airflow and any sink of airflow. For example, the airflow paths can be shown for any combinations of rack/cooler and inlet/outlet airflow tracking including rack to cooler, cooler to rack, rack to rack, or cooler to cooler airflow paths. Coolers and racks may be referred as cooling producers or providers and cooling consumers interchangeably. In addition, inlets and outlets may be referred to as inlets or originators and exhausts or outlets. While the fractional quantities of airflow described below are based on airflow associated with a rack, it is appreciated that the airflow paths specifically for a cooler can also be determined and displayed.

FIG. 3 illustrates one example of a data center room 300 including airflow paths in a hot-aisle that are generated using the airflow paths visualization method described below. The two rows of equipment 302 shown in FIG. 3 are separated by a hot aisle and include an equipment rack 304, and in-row coolers 306a-d and other equipment racks which are not labeled. A data center operator or designer, via the interface 104, can select a particular equipment rack within the data center cluster to display airflow paths into and out of the selected equipment rack. While FIG. 3 shows the airflows paths associated with selected equipment rack 304, the operator or designer may select another equipment rack in the data center and the interface 104 can display the associated airflow paths for the other equipment racks.

The airflows 308a-e represent airflow exhausted from the outlet of the equipment rack 304 into the hot aisle and drawn into the inlets of the coolers 306a-d. The HACI associated with equipment rack 304 is displayed as 89%. Three percent of the rack's airflow is captured by the cooler 306a, 11% of the rack's airflow is captured by the cooler 306b, 46% by the cooler 306c and 29% of the rack's airflow is captured by the cooler 306d. In the example shown in FIG. 3, the cooling consumers include in-row coolers and cooling producers include racks of equipment. However, it is appreciated that embodiments described herein may be used to represent airflow connection between any airflow source/sink pairing.

The airflow paths, as shown in FIG. 3, can be represented as arrows embedded in the shape of the airflow path, which indicate the source and sink connection associated with the airflow. In FIG. 3, the airflow paths represent airflow originating from the outlet of the equipment rack 304 and terminating at the inlet of the coolers 306a-d. In one example, the cross-sectional areas of the airflow paths are proportional to the inlet or outlet area associated with the selected equipment rack 304. For example, the airflow path 308a from the outlet of the equipment rack 304 to the inlet of the cooler 306c has a cross-sectional area equal to 46% of the total cross-sectional area of the airflow path which emergences from equipment rack 304. The cross-sectional area of the airflow path between equipment rack 304 and the inlet of cooler 306a is 3% of the total cross-sectional area of the airflow path which emergences from equipment rack 304.

According to some embodiments, the cooling consumers, producers and the airflow paths can be associated with a particular color to help visualize the different temperatures or other characteristics of the airflows. For example, in FIG. 3 the equipment rack 304 and the airflow paths 308a-e from outlet of the equipment rack 304 to the coolers 306 can be colored a shade of red to indicate high temperatures of air exhausted from the equipment rack 304 and captured by the coolers 306. The colors can include gradients or shades of colors to indicate ranges of temperatures associated with the airflow paths.

As shown in FIG. 3, the airflow-path plots include an airflow path 308e that points up to an area above the equipment/aisle (i.e., towards the data center ceiling). The airflow path 308e represents airflow exchanged with the rest of the data center. This airflow may represent which escapes the rack's immediate hot aisle. This air could then be recirculated into the inlets of equipment racks or ultimately captured by coolers which are not considered "local." For example, in FIG. 3, 11% of the subject equipment rack's exhaust is not captured by any of the row-based coolers in its immediate hot aisle group. The additional upward-directed arrow implies that 11% of the rack's airflow escapes into the surrounding data center. It is appreciated that the airflow associated with the coolers 306a-d (3%, 11%, 46% and 29%), together with the uncaptured airflow 308e (11%), sum up to 100%.

FIG. 4 illustrates one example of a data center room 400 including airflow paths generated using the method described below applied to a cold aisle. The two rows of equipment 402 shown in FIG. 4 are separated by the cold aisle and include the equipment rack 404, in-row coolers 406a, 406b, and perforated floor tiles 406c-e. The airflow paths 408a-e represent airflows that originate from the coolers and perforated floor tiles 406a-e supplied into the cold aisle and drawn in by the equipment rack 404. The CACI associated with the equipment rack 404 is displayed as 100%. Eight percent of the rack's airflow originates from the cooler 406a, 7% from the cooler 406b, 10% from the perforated floor tile 406c, 25% from the perforated floor tile 406d and 50% from the perforated floor tile 406e.

In various examples, colors of airflow paths can be used to indicate temperatures of airflow within the cold aisle, with gradients of colors representing different relative temperatures on a scale from hot to cold. For example, the equipment rack 404 can draw air from various sources including the coolers 406a and 406b and the perforated floor tiles 406c-e. In one example, the perforated tile 406c may supply air at 60 deg F. while the row-based cooler 406a may supply air at 70 deg F. The airflow path 408c representing airflow supplied by the perforated tile 406c may be colored closer to the cool side than airflow path 408a representing airflow supplied by the cooler 406a, which may be colored closer to the hot side of the color scale.

In addition to the airflow consumed by the equipment rack 404 detailed by 408a-e, an airflow 406f of 0% represents the fact that all of the airflow consumed by the equipment rack is supplied by the cooling providers in the immediate cold aisle group. It is appreciated that the fractional quantities of airflow associated with the coolers and perforated floor tiles 406a-e (7%, 8%, 10%, 25% and 50%), together with the uncaptured airflow 408f (0%), sum up to 100%.

According to various examples, the data center design and management system 106 can determine the fractional quantities of airflow associated with the cooling producers, for example 306a-d, and 406a-e, and generate the airflow paths, for example 308a-d and 408a-e, using the method described below. The interface 104 can display the airflow paths as 3D continuous rectangular streams from the sources of airflow to the destinations of airflow. In addition, the interface 104 can display the HACIs and CACIs and their associated fractional quantities of airflow for each rack. The data center designer or operator can view the airflow paths and the fractional quantities displayed via the interface 104 and make decisions such as placement of additional equipment in the data center such as additional cooling consumers or producers. The data center designer or operator can also arrange equipment in the data center based on the airflow paths, such as moving cooling consumers or cooling producers for added efficiency.

Figure 5:
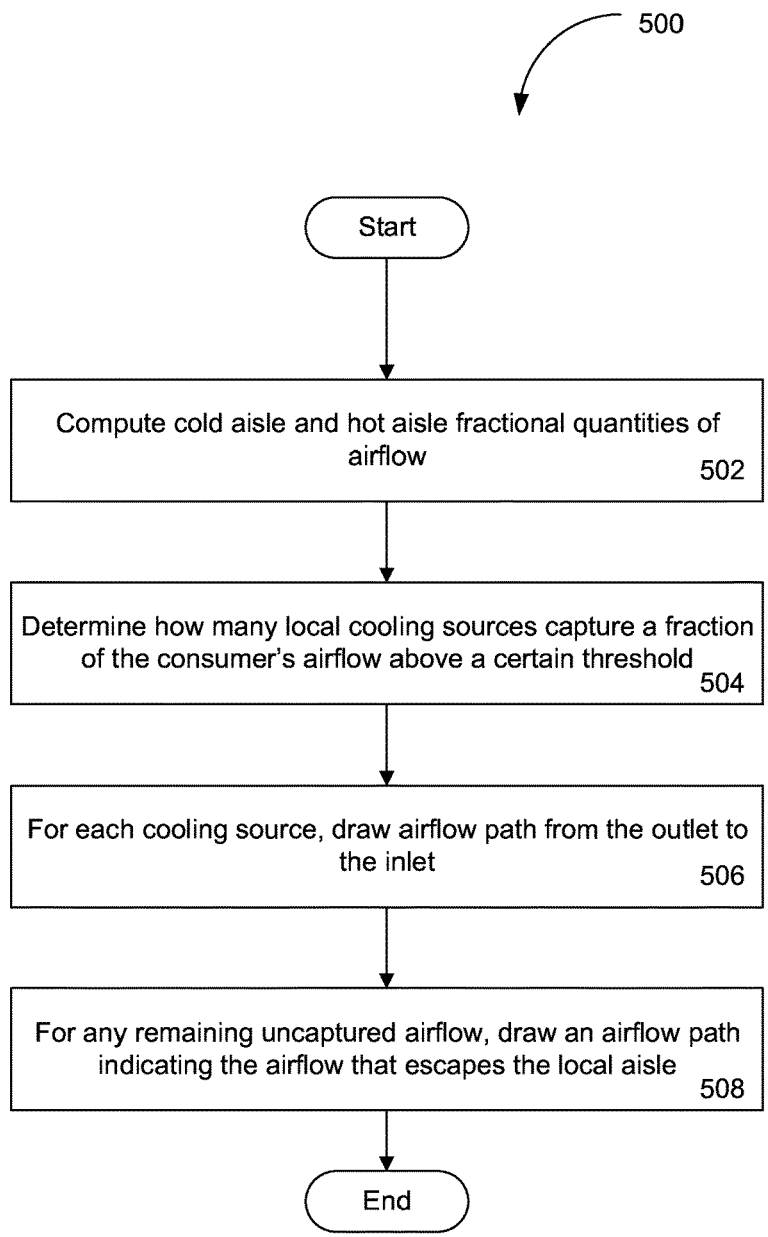
FIG. 5 is a flowchart of a process in accordance with one example.

As discussed above, visualizing fractional quantities can provide significant advantages over the prior 3D visualization techniques. According to some examples, a specially configured computer system, such as the data center design and management system 106 described above, implements a process to automatically generate airflow paths within modeled data center rooms. FIG. 5 illustrates an airflow path generation process 500 in accord with these examples. The method can be used for any combinations of source/sink, rack/cooler, or inlet/outlet airflow tracking including rack to cooler, cooler to rack, rack to rack, or cooler to cooler airflow paths. In addition, the method described below can be used in any application where the source and destination of airflow can be represented visually, for example general building HVAC system design and maintenance.

The process 500 starts with act 502. The computer system may receive information describing the layout of the data center, including the dimensions of the data center, dimensions of cooling consumers and producers, and locations and configurations of the cooling consumers and producers in the data center. In act 502, the computer system computes fractional quantities of airflow. Computing fractional quantities $f_{ij}$s and $g_{ij}$ provide a practical airflow-management value to the data center designer or operator. As described in PCT/US08/051908 application, the computer system determines CACIs by computing a fractional quantity $g_{ij}$s, which can be defined as the fraction of airflow entering rack i that originates from cooling source j.

$$CACI_i = \sum_{j=1}^{N} g_{ij} \qquad \text{Equation (1)}$$

where N is the number of cooling sources.

For example, the airflow can originate from row-based coolers, perforated floor and ceiling tiles, CRACs, overhead coolers, or other cooling sources. Similarly, the computer system calculates HACIs by computing a fractional quantity $f_{ij}$s, which can be defined as the fraction of exhaust airflow from rack i which is captured by cooling source j.

$$HACI_i = \sum_{j=1}^{N} f_{ij} \qquad \text{Equation (2)}$$

In the HACI calculation, N may include all local cooling extracts (cooler returns, local exhaust grilles, etc.) and, in the CACI calculation, N may include all local cooling supplies. In various examples, the airflow can be exhausted from cooling sources such as a row-based cooler, a local return vents, or other cooling sources.

There may be a variety of techniques for estimating the fractional quantities $f_{ij}$s and $g_{ij}$s, according to various examples. In one example, empirical models may be used to calculate the fractional quantities $f_{ij}$s and $g_{ij}$s. Methods of calculating fractional quantities $f_{ij}$s and $g_{ij}$s and other performance metrics are described in the PCT/US08/051908 application, and the PCT/US06/16739 application. In one embodiment, to determine fractional quantities $f_{ij}$s and $g_{ij}$s empirically, a large pool of CFD calculations can be performed to establish and refine empirical rules. In other embodiments, neural networks and other techniques may be used to refine rules. One example of empirically determined $f_{ij}$s and $g_{ij}$s includes determining all rack-cooling unit interactions based on the magnitude of airflow associated with the racks and cooling units and their relative geometric positions. The model includes empirical constants which can be selected to provide the best statistical fit to benchmark CFD data.

In other examples, physics-based methods may be used to calculate the fractional quantities $f_{ij}$s and $g_{ij}$s. The physics-based methods can include subdividing the data center into a large number of grid cells and computing quantifies such a airflow velocities and temperatures at each cell based on the principles of conservation of mass, conservation of momentum, and/or conservation of energy. Techniques include, Potential Flow Modeling (PFM), traditional CFD, and Sub-zonal models.

With these physics-based methods, the fractional airflow quantities and, if desired, CIs, are typically computed using concentration-tracking methods. In one embodiment, the use of chemical concentrations with, for example a CFD analysis, can be used to quantitatively determine the $f_{ij}$s associated with a rack's exhaust airflow. The exhaust airflow of a rack is identified in such an analysis as a separate species having the same properties as air, so as not to change the physics of airflow yet allow for identification and tracking of all of the airflow exiting the rack. The fraction of hot air released from rack i (identified as $C^i$) which is captured by the inlet of a local cooling provider j may be computed using the equation below.

$$f_{ij} = C_j^i (Q_{coolerj})/Q_{racki} \qquad \text{Equation (3)}$$

where $C_j^i$ is the concentration of $C^i$ at the inlet of cooler j; $Q_{coolerj}$ is the airflow rate (e.g. in cfm) associated with the cooling provider inlet; and $Q_{racki}$ if the airflow rate (e.g. in cfm) through rack i. In addition, similar concentration-tracking methods can be used to calculate $g_{ij}$s for the fraction of cold airflow released from local cooling provider supplies in the cold-aisle.

Further, the concentration method can be extended from a method of determining airflow from a cooling supplier to a consumer and from a cooling consumer to a cooling provider to include a determination of airflow from a supplier to a supplier and from a consumer to a consumer. For example, concentration based methods can be used to calculate airflow from a cooler to a cooler and from an equipment rack to an equipment rack, for example in a case of recirculated airflow.

In step 504, the computer system determines how many local cooling sources capture a fraction of the rack's airflow above a certain threshold. In one embodiment, a threshold can be established to reduce the number of airflow paths displayed. For example, for clarity purposes airflow determined to have little impact on cooling equipment in the data center (a small number or a fraction) can removed in the airflow visualization. In other examples, in step 504, the determined airflow can be rounded up or down to provide a more straightforward airflow display. In one example, the threshold may be set by a designer or operator of the data center via the interface 104. For example, a data center designer or operator may desire to see more or less detailed representation of airflow by specifying the threshold, such as for example 0.5%, 1%, 5% or threshold amounts therebetween. In other examples, the threshold may be determined by the computer system based on preset default threshold amounts. In at least one example, the threshold may be determined by the computer system based on information stored in the database 110.

In one example, as the result of setting the threshold or rounding the determinate airflow a mismatch of airflow can occur. For example, if some of the fractional quantities include numbers after the decimal point that are rounded down, the airflow at an inlet or an outlet may not add to a total of 100% or add up to a total of more than 100% if the fractional quantities are rounded up. The computer system can allocate the remaining "mismatch" airflow into an airflow path that leaves/enters the aisle from the surrounding data center.

In step 506, for each cooling source, the computer system determines and generates a visual representation of an airflow path from the cooling consumer's source of airflow to the destination of airflow. According to the various embodiments, the airflow paths that are described mathematically above are linked to geometric features of the airflow paths based on predetermined rules. In one embodiment, the cross-sectional area of each generated airflow path can be proportional to airflow rate along that path represented by the fractional quantities calculated in step 502.

In one example, the cross sectional area is the intersection of a figure in 2D space with a line, or of a body in 3D space with a plane. For example, for a rectangular airflow path the cross sectional area is base multiplied by height. In another example, for a tubular shaped airflow path, the circular cross sectional area is $\pi r^2$. In yet another example, the elliptical cross sectional area is represented by $\pi ab$, where a and b are one-half of the ellipse's major and minor axes respectively.

In one example, the computer system may use information pertaining to the layout of the data center and the location of the cooling consumers and cooling producers in the data center to generate the airflow paths. The information pertaining to the layout and the location of the producers and consumer can be stored in the data center database 110 and accessed by the data center design and management system 106. For example, by accessing the location of a given consumer and given producer, the computer system can draw a path connecting the consumer and producer, and then link the cross-sectional area proportion to the fractional quantities associated with the consumer and the producer to the path.

In some embodiments, the computer system may include a number of predetermined rules used to generate the airflow paths. In one example, the predetermine rules can be stored in the data center database 110 and accessed by the data center design and management system 106. In addition, the user, via the interface 104, may view and change the options associated with the predetermined rules.

In at least one embodiment, the cross-sectional areas of the airflow paths into and out of a given cooling consumer or producer can sum to the total inlet or outlet area of that consumer or producer. The purpose of this rule, in one example, allows the computer system to visually display a conservation of mass for a user viewing the airflow paths in the interface 104. In one example, it follows that the larger the area of the inlet or the outlet of the consumer or the producer, the larger the amount of air exhausted or drawn in by the inlets and outlets and the larger the cross-sectional area of the airflow paths into and out of a given consumer or producer.

Figure 6A:
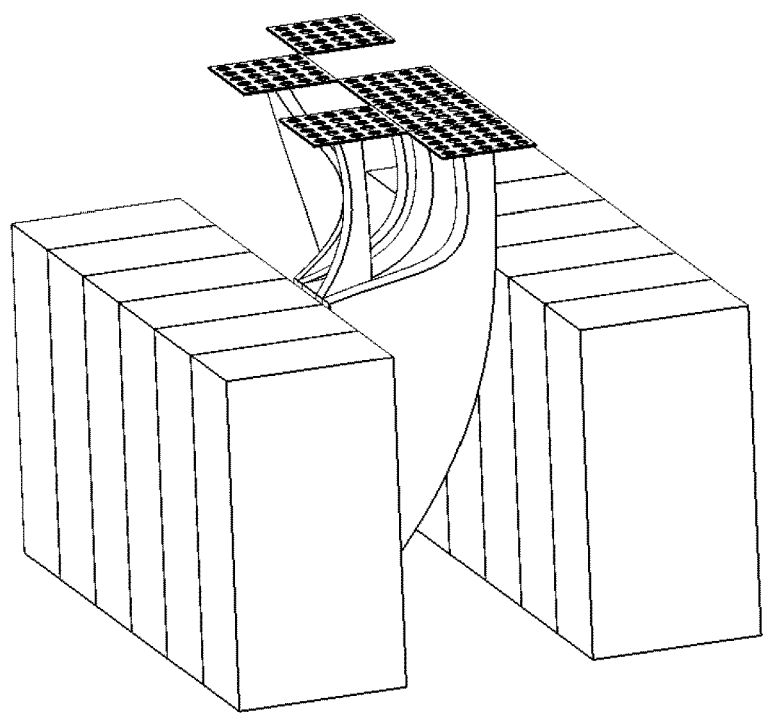
FIG. 6A is a schematic of an example of displaying airflow in a data center cluster that includes ceiling tiles, in accordance with at least one example.
Figure 6B:
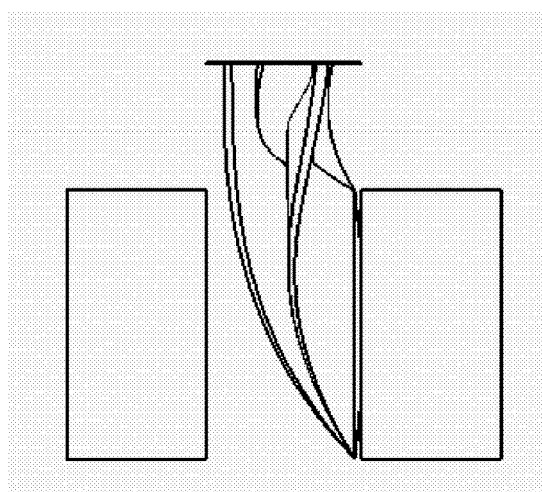
FIG. 6B is another schematic of the example of displaying airflow in a data center cluster that includes ceiling tiles in accordance with at least one example.

For example, FIG. 6 shows a configuration of two rows of equipment in a data center separated by a hot aisle. FIG. 6 shows airflow exhausted from an equipment rack and drawn into ceiling tiles disposed above the hot aisle. The sum of the cross-sectional areas of airflow paths out of the equipment rack represents the total outlet area of that equipment rack. Similarly, the cross-sectional area of airflow paths into the ceiling tiles represents the total inlet area of that ceiling tile. It is noted that the concept of conservation of mass may not precisely apply in examples where airflow values below a threshold are omitted or airflow values are rounded up or down.

In one example, the computer system may access the information pertaining to the inlet and outlet area of the consumer or producer and generate the airflow paths based on the area information. The information pertaining to the inlet and outlet area of the consumer or producer can be stored in the data center database 110 and accessed by the data center design and management system 106. According to one embodiment, another predetermined rule can include that the airflow paths are continuous from airflow inlets to outlets, or from cooling producers to cooling consumers. In one example, another predetermined rule can include the airflow paths to not cross one another or go through any solid objects. This rule allows for a clean display of individual airflow paths. In at least one example, airflow streams can enter or exit a cooling consumer over its entire flow area. In other examples, the predetermined rules can include a rule that the airflow streams can enter or exit a rack only at a center of the flow area. The center airflow approach may avoid the implication that airflow enters or exits only the bottom of the rack.

In one example, the airflow paths described above can be generated by the computer system for one object belonging to a single cold or hot aisle cluster at a given time. In some examples, this ensures that the displayed airflow paths do not become unclear or too busy and further ensures that streams do not cross. In at least one embodiment, the user, via the interface 104, may be able to select one object at a time and the data center design and management system 106 can calculate the airflow paths for the selected object and display the airflow paths to the user via the interface. As the user selects another object, the data center design and management system 106 can calculate and display the airflow paths for the subsequently selected object.

Figure 7:
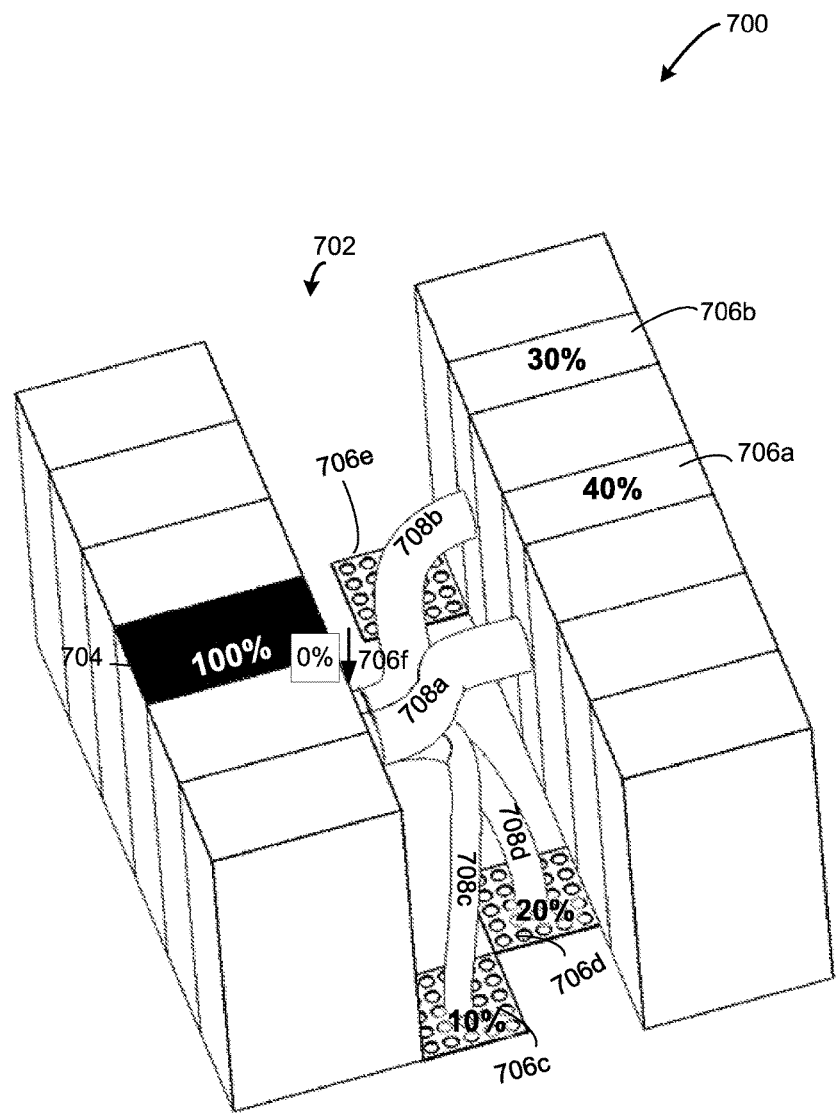
FIG. 7 is a schematic of an example of displaying airflow in accordance with another example.

The shape of the airflow paths may include a 3D rectangular form, which curves continuously from the source of the airflow to the destination of the airflow. The airflow paths may also include the use of tubular shaped or pipe-shaped airflow paths. The cross sections of tubular or pipe-shaped paths can include circular or elliptical contours. FIG. 7 illustrates one example of a model of the data center having two rows of equipment separated by a cold aisle 702 and includes the tubular airflow paths 708*a-f*. The tubular airflow paths 708*a-f* represent fractional quantities of airflow from the source and to destination of the airflow; in FIG. 7, from the outlets of the in-row coolers 706*a* and 706*b* and the perforated tiles 706*c*-706*e* to the inlets of the equipment rack 704. The tubular airflow comprises a circular cross section, the area of which corresponds to the representative fractional quantities of airflow. In addition, the airflow paths may include arrows disposed over the airflow paths. As noted above, the airflow paths can be color coded to different temperatures of airflows. In one example, the color coding can include gradients of colors to represent different temperature levels and provide additional granularity of cooling performance to the user. The geometries associated with the cooling consumers and producers in the data center can be accessed from the database 110. In one embodiment, the designer or operator, via the interface 104, can modify the areas or dimensions of the data center resulting in modified airflow path visualizations.

In step 508, for any remaining uncaptured airflow, the computer system determines and generates an airflow path indicating the rack exhaust airflows that escape the local aisle. In one example, the uncaptured airflow represents air drawn in from outside the aisle that is generally heated to some degree by the exhaust of the equipment rack and is also referred to as "recirculated air." It is appreciated that good cooling performance can be achieved if the majority of the airflow ingested by the equipment rack comes directly from the cooling supplier and little air is drawn in from the surrounding data center. For example, a fractional unsupplied quantity of 0% implies that all of the equipment rack inlet air was drawn directly from the cooling sources, while a fractional unsupplied quantity of 100% implies that all of the equipment rack inlet air was drawn from outside of the cold aisle. In one example, the fraction of airflow not supplied by cooling providers is calculated by the computer system as the quantity of airflow captured from coolers subtracted from the total amount of airflow ingested by the rack. In other examples, the airflow not supplied by cooling providers can be determined using similar methods as those described above in step 502, including the empirical and physics-based methods of calculating airflow.

Figure 8:
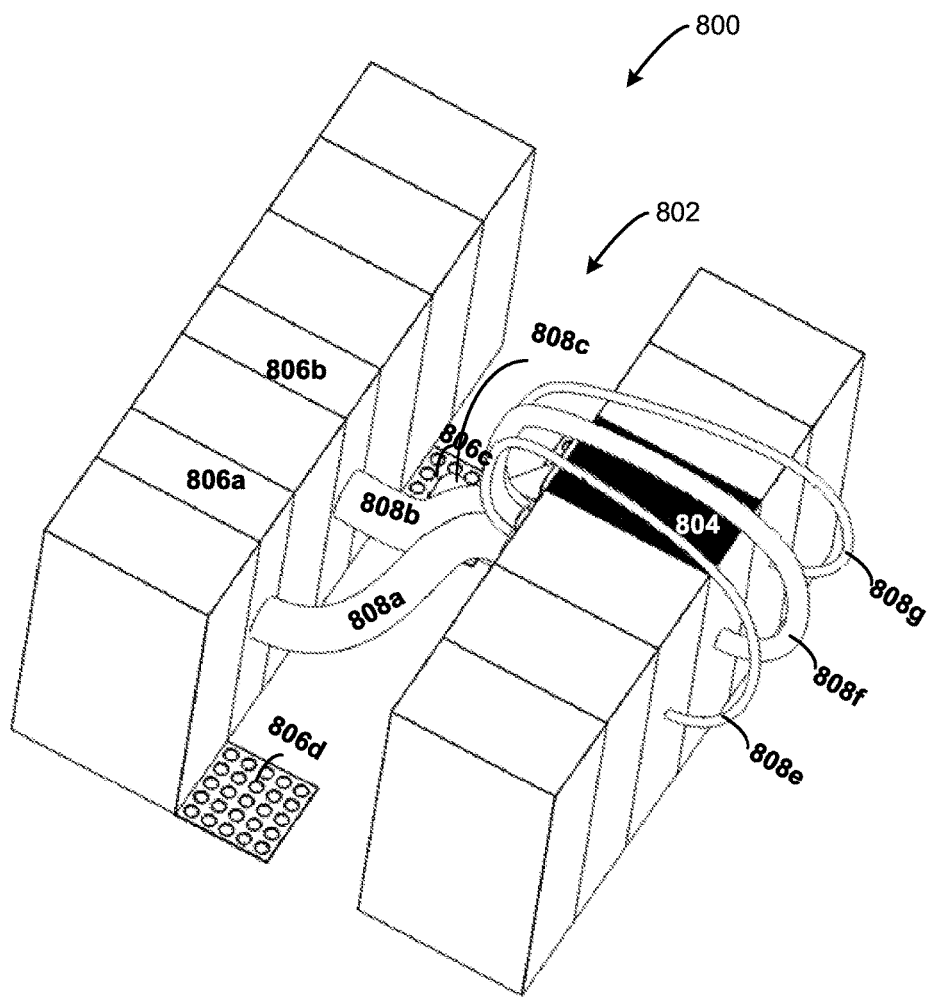
FIG. 8 is a schematic of an example of displaying airflow in a data center cluster that includes floor tiles in accordance with at least one example.

FIG. 8 illustrates one example of displaying recirculated airflow or airflow not supplied by cooling providers in a data center cluster 800. The cluster 800 is separated by the cold aisle 802 and includes a selected equipment rack 804, in-row coolers 806a, 806b, and perforated floor tiles 806c and 806d. The airflow paths 808a-c represent airflow originating from the outlet of the in-row coolers 806a-b and the perforated tiles 806c into the cold aisle and drawn into inlet of the equipment rack 804. In addition, airflows 808e-g explicitly represent recirculated airflow or the airflow not supplied by cooling providers in the immediate cold aisle group.

Figure 9:
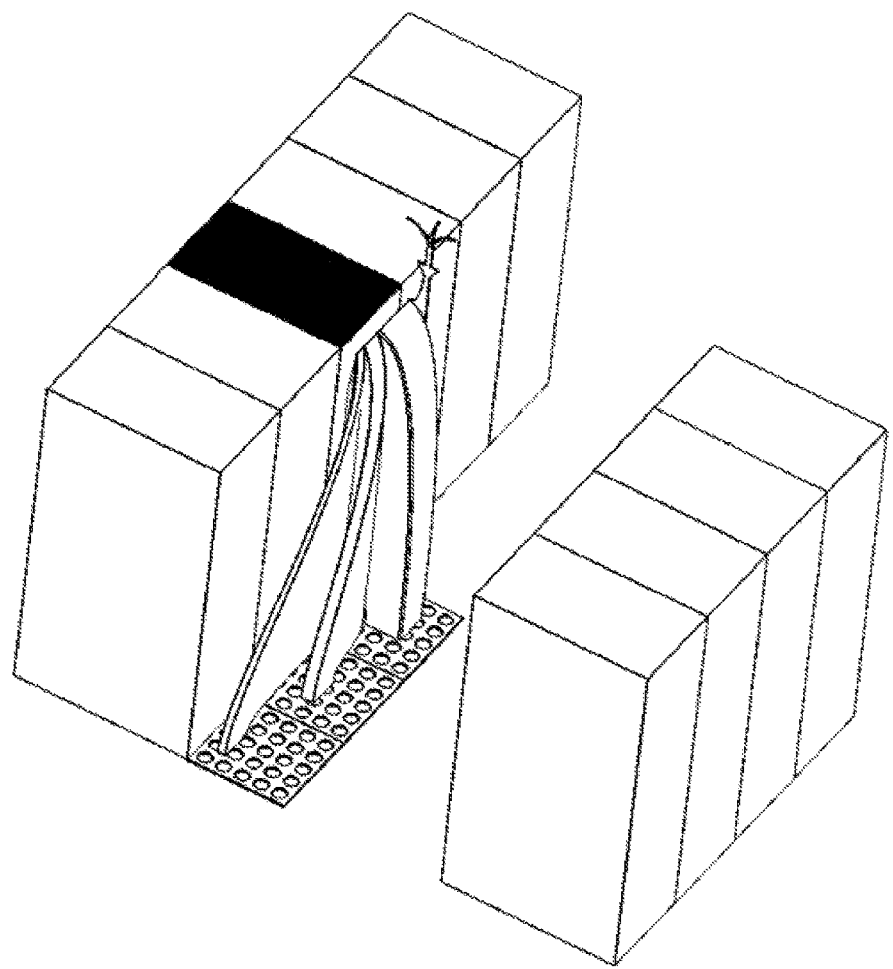
FIG. 9 is another schematic of an example of displaying airflow in a data center cluster that includes floor tiles in accordance with at least one example.
Figure 10:
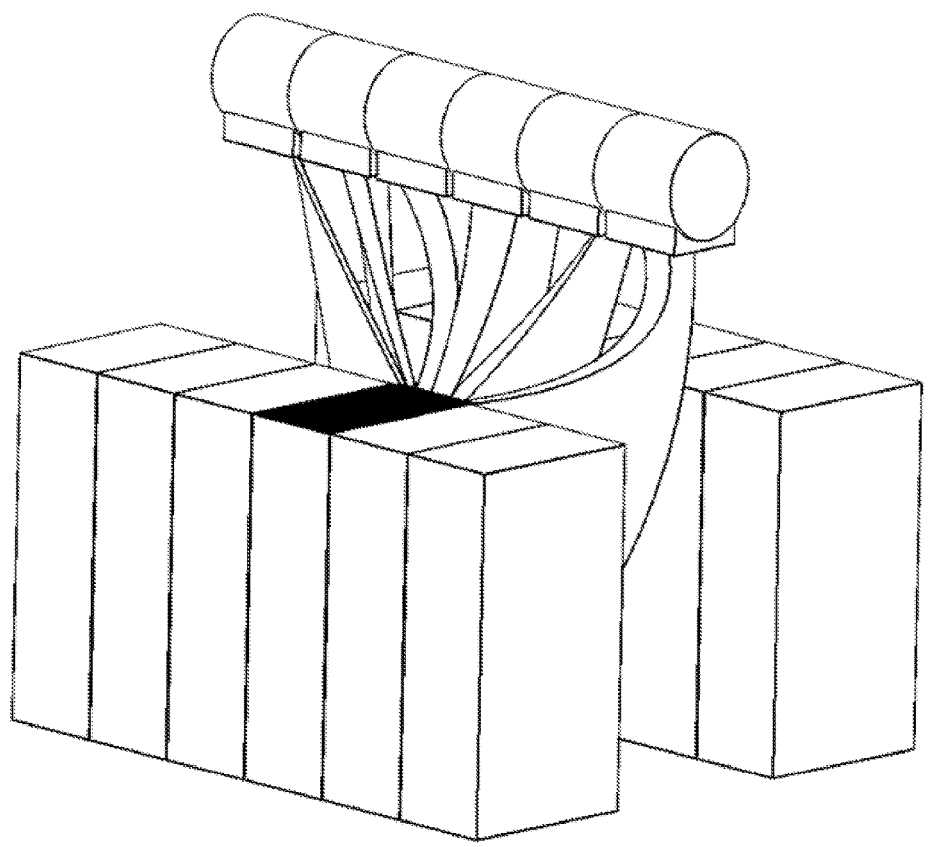
FIG. 10 is a schematic of another example of displaying airflow in a data center cluster that includes overhead cooling units in accordance with at least one example.
Figure 11:
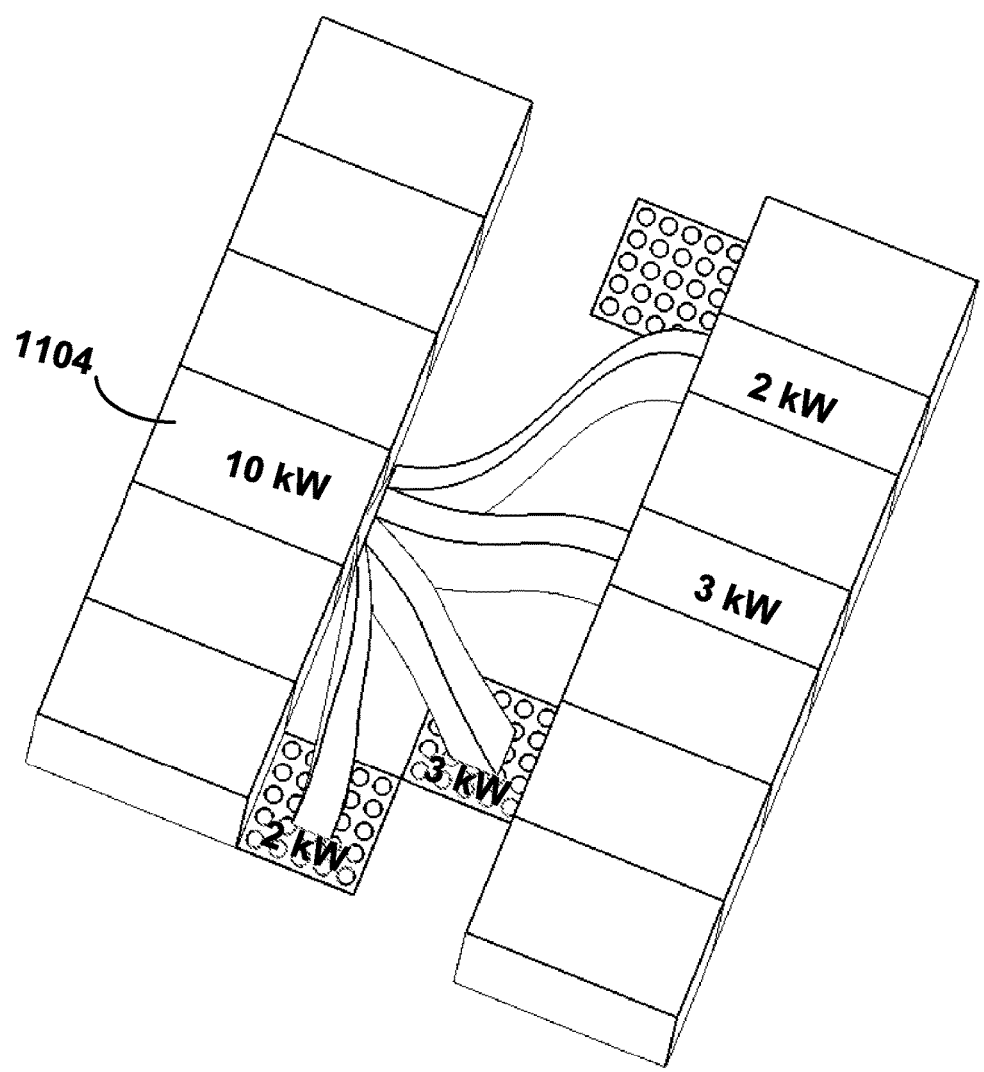
FIG. 11 is a schematic of an example of displaying cooling power in accordance with at least one example in a data center cluster.

As described above, the airflow paths may be associated with cooling sources such as row-based coolers, overhead coolers, airflow from CRACs through ceiling tiles or raised floor tiles, or other cooling sources. FIGS. 9-11 illustrate airflow paths calculated and displayed for other configurations of cooling producers in a data center. For example, FIG. 9 shows a model of the data center having two rows of equipment separated by a cold aisle and includes the airflow paths from raised-floor tiles as the cooling providers. FIG. 10 shows a model of the data center having two rows of equipment separated by a cold aisle and includes overhead cooling as the source of cooling.

The airflow path visualization method discussed above can also be used to display the airflow split (e.g., in cfm) or cooling power split (e.g., in W) entering or existing each cooling consumer or producer. In at least one embodiment, the approximate cooling power split exiting a cooling consumer can be computed as:

$$P_{ij} = f_{ij} P_i \qquad \text{Equation (4)}$$

where $P_{ij}$ is the fraction of cooling power of consumer i that is attributable to cooling provider j, $P_i$ is the heat generated by consumer i, and $f_{ij}$ which can be defined as the fraction of exhaust airflow from consumer i which is captured by cooling source j. A similar cooling power split can be calculated for the inlet to the consumer i using the fractional quantity $g_{ij}$, which can be defined as the fraction of airflow entering consumer i that originates from cooling source j.

Similar to the airflow method, in one example, the computer system using the cooling power visualization method first determines the fractional power quantity as described by Equation (4). The computer system can then determine the number of local cooling sources that capture a fraction of the cooling power over a predetermined threshold. For each cooling source, the computer system can draw a cooling power path from the outlet to the input. FIG. 11 shows one example of visualizing cooling power for a consumer 1104. In one example, a cooling supply counted on the inlet side (e.g., a perforated tile) may receive its cool air from the same cooling equipment which is attributable to the rack cooling on the exhaust side.

In other embodiments, the concept of cooling power supplied by each cooling provider can be extended to take into consideration the temperature of airflow supplied—which may be different for each provider.

According to one embodiment, the airflow visualization method can also be extended to individual servers (instead of entire racks). In one example, the airflow streams can enter or exit a rack only over the area occupied by the server. This would provide additional value in that it would be quite easy to see the specific cooling source (e.g., perforated tile or local cooler) which is supplying/capturing the server airflow. It may also quickly reveal details such as the fact that the exhaust from only the server located in the top of the rack escapes into the surrounding data center while the exhaust from all other servers in the rack is captured. This additional detail may provide actionable information for data center personal. For example, they may decide to put the higher-airflow equipment near the bottom of the rack.

The airflow path visualization method can also be used to display cooling performance of a data center as a result of a transient analysis. The computer system may provide modeling of airflow for a proposed layout of data center equipment and also provide prediction of cooling performance for an installed or planned data center which incorporates the effect of transient events. Methods of computing a transient analysis of the data center layout are described in Patent Cooperation Treaty Application No., PCT/US11/066877, titled "ANALYSIS OF EFFECT OF TRANSIENT EVENTS ON TEMPERATURE IN A DATA CENTER" filed Dec. 22, 2011, (referred to herein as "the PCT/US11/066877 application"), which is assigned to the assignee of the present application, and is hereby incorporated herein by reference in its entirety. The PCT/US11/066877 application describes examples of performing a transient analysis including first receiving information regarding user-specified transient events (e.g., cooler fans being turned off or a rack suddenly dissipating more heat). The computer system then determines the time period to be analyzed and breaks the overall time period down into a number of discrete periods between events. The computer system can then determine airflow patterns and temperatures for the starting conditions (e.g., steady-state conditions before a power failure at t=0). Then, the computer system can compute airflow patterns and temperatures for each time period to be analyzed.

The aspects disclosed herein in accordance with the present embodiments, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment disclosed herein, a computer system is configured to perform any of the functions described herein, including but not limited to, configuring, modeling and presenting information regarding specific data center configurations. Further, computer systems in embodiments may be used to automatically measure environmental parameters in a data center, and control equipment, such as chillers or coolers to optimize performance. Moreover, the systems described herein may be configured to include or exclude any of the functions discussed herein. Thus the embodiments are not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present embodiments may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accordance with the present embodiments may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the embodiments are not limited to executing on any particular system or group of systems. Further, aspects may be implemented in software, hardware or firmware, or any combination thereof. Thus, aspects in accordance with the present embodiments may be implemented within methods, acts, systems, system elements and components using a variety of hardware and software configurations, and the embodiments are not limited to any particular distributed architecture, network, or communication protocol.

Figure 12:
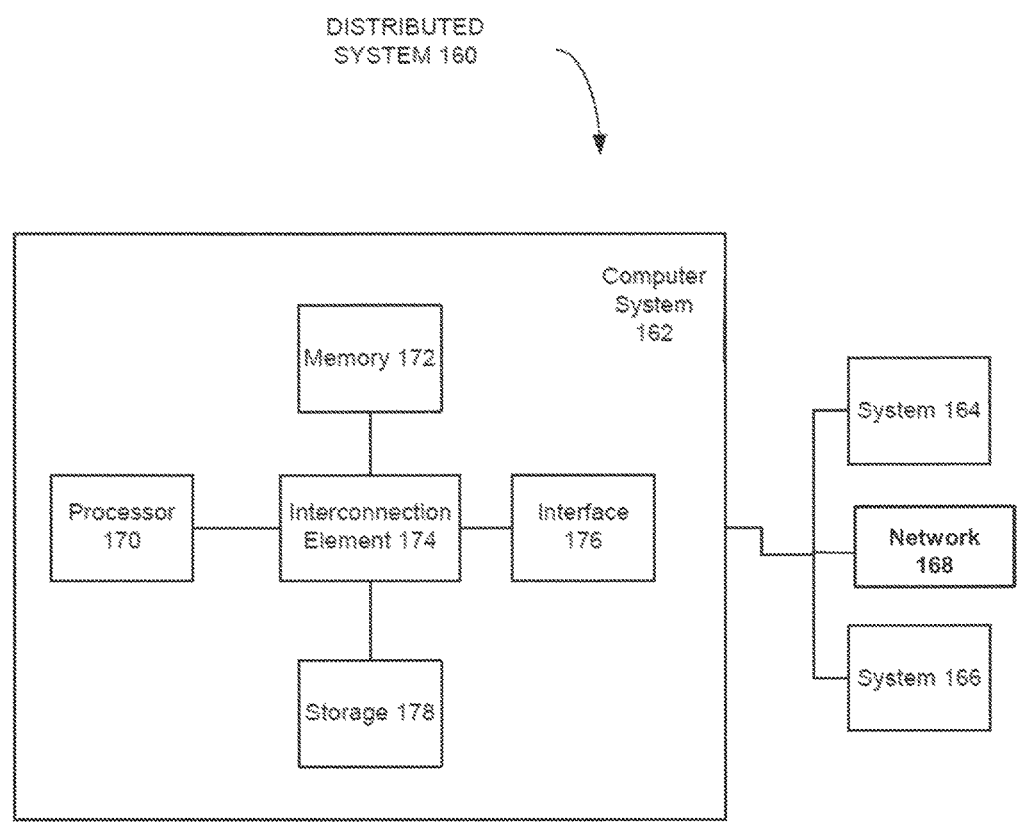
FIG. 12 is a block diagram of one example of a computer system with which various aspects in accord with the present invention may be implemented.

FIG. 12 shows a block diagram of a distributed computer system 160, in which various aspects and functions in accord with the present embodiments may be practiced. Distributed computer system 160 may include one more computer systems. For example, as illustrated, distributed computer system 160 includes computer systems 162, 164 and 166. As shown, computer systems 162, 164 and 166 are interconnected by, and may exchange data through, communication network 168. Network 168 may include any communication network through which computer systems may exchange data. To exchange data using network 168, computer systems 162, 164 and 166 and network 168 may use various methods, protocols and standards, including, among others, token ring, Ethernet, wireless Ethernet, Bluetooth, TCP/IP, UDP, Http, FTP, SNMP, SMS, MMS, SS7, Json, Soap, and Corba. To ensure data transfer is secure, computer systems 162, 164 and 166 may transmit data via network 168 using a variety of security measures including TLS, SSL or VPN among other security techniques. While distributed computer system 160 illustrates three networked computer systems, distributed computer system 160 may include any number of computer systems and computing devices, networked using any medium and communication protocol.

Various aspects and functions in accordance with the present embodiments may be implemented as specialized hardware or software executing in one or more computer systems including computer system 162 shown in FIG. 12. As depicted, computer system 162 includes processor 170, memory 172, interconnection element 174, interface 176 and storage 178. Processor 170 may perform a series of instructions that result in manipulated data. Processor 170 may be a commercially available processor such as an Intel Pentium, Motorola PowerPC, SGI MIPS, Sun UltraSPARC, or Hewlett-Packard PA-RISC processor, but may be any type of processor, multi-processor, microprocessor or controller as many other processors and controllers are available. Processor 170 is connected to other system elements, including one or more memory devices 172, by interconnection element 174.

Memory 172 may be used for storing programs and data during operation of computer system 162. Thus, memory 172 may be a relatively high performance, volatile, random access memory such as a dynamic random access memory (DRAM) or static memory (SRAM). However, memory 172 may include any device for storing data, such as a disk drive or other non-volatile, non-transitory, storage device. Various embodiments in accordance with the present invention may organize memory 172 into particularized and, in some cases, unique structures to perform the aspects and functions disclosed herein.

Components of computer system 162 may be coupled by an interconnection element such as interconnection element 174. Interconnection Element 174 may include one or more physical busses, for example, busses between components that are integrated within a same machine, but may include any communication coupling between system elements including specialized or standard computing bus technologies such as IDE, SCSI, PCI and InfiniBand. Thus, interconnection element 174 enables communications, for example, data and instructions, to be exchanged between system components of computer system 162.

Computer system 162 also includes one or more interface devices 176 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 162 to exchange information and communicate with external entities, such as users and other systems.

Storage system 178 may include a computer readable and writeable, nonvolatile, non-transitory, storage medium in which instructions are stored that define a program to be executed by the processor. Storage system 178 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as memory 172, that allows for faster access to the information by the processor than does the storage medium included in storage system 178. The memory may be located in storage system 178 or in memory 172, however, processor 170 may manipulate the data within the memory 172, and then may copy the data to the medium associated with storage system 178 after processing is completed. A variety of components may manage data movement between the medium and integrated circuit memory element and the presently described embodiments are not limited thereto. Further, the embodiments are not limited to a particular memory system or data storage system.

Although computer system 162 is shown by way of example as one type of computer system upon which various aspects and functions in accordance with the present embodiments may be practiced, any aspects of the presently disclosed embodiments are not limited to being implemented on the computer system as shown in FIG. 12. Various aspects and functions in accord with the presently disclosed embodiments may be practiced on one or more computers having a different architectures or components than that shown in FIG. 12. For instance, computer system 162 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 162 may be a computer system including an operating system that manages at least a portion of the hardware elements included in computer system 162. Usually, a processor or controller, such as processor 170, executes an operating system which may be, for example, a Windows-based operating system, such as, Windows NT, Windows 2000 (Windows ME), Windows XP, Windows Vista, Windows 7, and Windows 8 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C-, bytecode or interpreted code which communicates over a communication network, for example, the Internet, using a communication protocol, for example, TCP/IP. Similarly, aspects in accord with the presently disclosed embodiments may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the presently disclosed embodiments may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the presently disclosed embodiments are not limited to a specific programming language and any suitable programming language could also be used.

A computer system included within an embodiment may perform additional functions outside the scope of the presently disclosed embodiments. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB, a subsidiary of Oracle or integration software such as Web Sphere middleware from IBM of Armonk, N.Y. However, a computer system running, for example, SQL Server may be able to support both aspects in accord with the presently disclosed embodiments and databases for sundry applications.

Embodiments described herein provide novel methods and systems for determining airflow through areas in a building and equipment in a data center. The ability to predict airflow accurately in a design or management tool in the embodiments disclosed herein facilitates designing robust infrastructure such as data centers and HVAC systems that exhibit good cooling and ventilation performance under different layout configurations. Further, embodiments facilitate avoiding costly trial-and-error solutions in a facility in attempts to achieve particular performance results. Still further, better accuracy in airflow predictions results in improved overall data center cooling analysis and building ventilation system and can provide a more energy efficient solutions. In at least some embodiments described herein, airflow is described as being generated by inlets, outlets, fans and leakages. Systems and methods described herein can be used with other types of sources of air, including other types of cooling, ventilation devices and fans. In at least some embodiments, methods are described as determining specific airflows. In at least some embodiments, the determination is a prediction or estimation of actual airflows.

In at least some embodiments described above, the design of a facility (such as a data center) and/or actual parameters are altered based on predicted airflow in the facility. The alterations may be implemented to improve the cooling performance and/or may be implemented to provide cost and/or power savings when the performance is found to be within predetermined specifications. For example, the location of equipment racks may be changed and/or the types of racks or rack configurations may be changed. Further, based on determined airflow values, a data management system in accordance with one embodiment may control one or more CRACs or in-row cooling devices to adjust the airflow, and in addition, one or more equipment racks can be controlled to reduce power if the airflow from cooling providers is not adequate to provide sufficient cooling.

In at least some embodiments described above, tools and processes are provided for determining rack airflow in a data center and airflow in a building. In other embodiments, the tools and processes may be used in other types of facilities, and may also be used in mobile applications, including mobile data centers. Further, processes and systems in accordance with embodiments described herein may be used in a wide variety of equipment racks having various inlets, outlets and internal structures. The terms inlet and outlet, as used herein, may include a single open area of a rack such as a vent, a group of vents closely spaced together to effectively act as one opening, or a single opening having many individual open areas.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system comprising:
   a memory; and
   a controller coupled to the memory and configured to:
   receive data related to equipment including at least two of a group comprising a cooling consumer and a cooling provider;
   compute quantities of airflow between an inlet and an outlet associated with the equipment;
   generate a three-dimensional representation of each airflow path of a variety of airflow paths between the outlet and the inlet, the each three-dimensional representation having a cross-sectional area proportional to a quantity of airflow and is configured such that one airflow path of the variety of airflow paths does not cross one another airflow path of the variety of airflow paths, wherein each airflow path of the variety of airflow paths includes a representation of percentage of airflow;
   display the three-dimensional representation of each airflow path of the variety of airflow paths in a cooling model; and
   control equipment of the group based on the computed quantity of airflow.

2. The system of claim 1, wherein each quantity of airflow comprises at least one fractional quantity of airflow including one of a fraction of airflow that originates from the cooling consumer that is captured by the cooling provider, or a fraction of airflow captured by the cooling consumer that originates from the cooling provider.

3. The system of claim 1, wherein the controller is configured to generate the representation of each airflow path such that the cross-sectional area of airflow into and out of the equipment is proportional to an inlet or an outlet area of the equipment.

4. The system of claim 3, wherein the controller is configured to generate the representation of each airflow path such that a total amount of airflow into and out of the equipment corresponds to a total inlet or outlet area of the equipment.

5. The system of claim 1, wherein the controller provides an indication for a user to arrange equipment in a data center based on the representation of each one airflow path.

6. The system of claim 1, wherein each quantity of airflow includes at least one quantity of recirculated airflow.

7. The system of claim 1, wherein the three-dimensional representation has one of a rectangular and a tubular shape.

8. The system of claim 1, wherein the controller is configured to generate the representation of each airflow path for the sources having the airflow quantities exceeding a predetermined threshold.

9. The system of claim 1, wherein the controller is configured to:
   compute at least one cooling power quantity as a function of heat generated by the cooling consumer and each quantity of airflow;
   generate a representation of at least one cooling power path from the cooling provider to the cooling consumer having a cross-sectional area based on the at least one cooling power quantity; and
   display the representation of the at least one cooling power path in the cooling model.

10. The system of claim 1, wherein the equipment is positioned in a data center and the controller is configured to:
    compute each quantity of airflow between the data center and one of the inlet and the outlet associated with the equipment;
    generate a representation of the variety of airflow paths between the data center and the one of the inlet and the outlet; and
    display the representation of each airflow path between the data center and the one of the inlet and the outlet in the cooling model.

11. A method comprising:
    receiving data related to equipment including at least two of a group comprising a cooling consumer and a cooling provider;
    computing, by a computer system, quantities of airflow between an inlet and an outlet associated with the equipment;
    generating, by the computer system, a three-dimensional representation of at least one each airflow path of a variety of airflow paths between the inlet and the outlet, the three-dimensional representation having a cross-sectional area proportional to each quantity of airflow and is configured such that one airflow path of the variety of airflow paths does not cross one another airflow path of the variety of airflow paths, wherein each airflow path of the variety of airflow paths includes a representation of percentage of airflow;
    displaying, by the computer system, the three-dimensional representation of each airflow path in a cooling model; and
    arranging equipment in a data center based on the representation of the at least one each airflow path.

12. The method of claim 11, wherein computing each quantity of airflow computing at least one fractional quantity of airflow, representing one of a fraction of airflow originating from the cooling consumer that is captured by the cooling provider, or a fraction of airflow entering the cooling consumer that originates from the cooling provider.

13. The method of claim 11, wherein generating the representation further comprises generating the representation of each airflow path such that the cross-sectional area of airflow into and out of the equipment is proportional to an inlet or an outlet area of the equipment.

14. The method of claim 13, wherein generating the representation further comprises generating the representation of each airflow path such that a total amount of airflow into and out of the equipment corresponds to a total inlet or outlet area of the equipment.

15. The method of claim 11, wherein each quantity of airflow includes at least one quantity of recirculated airflow.

16. The method of claim 11, wherein the three-dimensional representation has one of a rectangular and a tubular shape.

17. The method of claim 11, further comprising computing at least one cooling power quantity as a function of heat generated by the cooling consumer and the at least one fractional quantity of airflow;

generating a representation of at least one cooling power path from the cooling provider to the cooling consumer having a cross-sectional area based on the at least one cooling power quantity; and displaying the representation of the at least one cooling power path in the cooling model.

18. A non-transitory computer readable medium having stored thereon sequences of instruction that will cause at least one processor to:

receive data related to equipment including at least two of a group comprising a cooling consumer and a cooling provider;

compute quantities of airflow between an inlet and an outlet associated with the equipment;

generate a three-dimensional representation of each airflow path of a variety of airflow paths between the inlet and the outlet, the three-dimensional representation having a cross-sectional area proportional to each quantity of airflow and is configured such that one airflow path of the variety of airflow paths does not cross one another airflow path of the variety of airflow paths, wherein each airflow path of the variety of airflow paths includes a representation of percentage of airflow;

display the three-dimensional representation of each airflow path in a cooling model; and control equipment of the group based on the computed quantity of airflow.

* * * * *